United States Patent
Uber, III et al.

(10) Patent No.: US 12,514,974 B2
(45) Date of Patent: Jan. 6, 2026

(54) SYSTEM AND METHODS FOR DELIVERING A TEST BOLUS FOR MEDICAL IMAGING

(71) Applicant: BAYER HEALTHCARE LLC, Whippany, NJ (US)

(72) Inventors: Arthur Uber, III, Pittsburgh, PA (US); William Barone, Pittsburgh, PA (US)

(73) Assignee: BAYER HEALTHCARE LLC, Whippany, NJ (US)

( * ) Notice: Subject to any disclaimer, the term of this patent is extended or adjusted under 35 U.S.C. 154(b) by 945 days.

(21) Appl. No.: 17/606,532

(22) PCT Filed: Jun. 2, 2020

(86) PCT No.: PCT/US2020/035699
§ 371 (c)(1),
(2) Date: Oct. 26, 2021

(87) PCT Pub. No.: WO2020/247370
PCT Pub. Date: Dec. 10, 2020

(65) Prior Publication Data
US 2022/0133982 A1    May 5, 2022

Related U.S. Application Data

(60) Provisional application No. 62/856,931, filed on Jun. 4, 2019, provisional application No. 62/857,046, filed on Jun. 4, 2019.

(51) Int. Cl.
*A61M 5/00* (2006.01)
*A61M 5/168* (2006.01)
*A61M 5/142* (2006.01)

(52) U.S. Cl.
CPC ........ *A61M 5/007* (2013.01); *A61M 5/16877* (2013.01); *A61M 2005/14208* (2013.01); *A61M 2205/502* (2013.01)

(58) Field of Classification Search
CPC .............. A61M 5/007; A61M 5/16877; A61M 2005/14208; A61M 2205/502
See application file for complete search history.

(56) References Cited

U.S. PATENT DOCUMENTS

| | | | |
|---|---|---|---|
| 5,494,036 A | 2/1996 | Uber, III et al. | |
| 5,583,902 A | 12/1996 | Bae | |

(Continued)

FOREIGN PATENT DOCUMENTS

| | | |
|---|---|---|
| JP | 5203971 B2 | 6/2013 |
| WO | 2018098130 A1 | 5/2018 |
| WO | 2019199632 A1 | 10/2019 |

OTHER PUBLICATIONS

Bae, et al. "Aortic and Hepatic Contrast Medium Enhancement at CT—Part I, Prediction with a Computer Model", Radiology 1998;207:647-655.

(Continued)

*Primary Examiner* — Kaitlyn E Sebastian
(74) *Attorney, Agent, or Firm* — James R. Stevenson; Bryan P. Clark; Joseph L. Kent

(57) ABSTRACT

Provided is a method for delivering a medical fluid. The method includes administering a test injection at a preselected total volumetric flowrate for a preselected duration. The preselected total volumetric flowrate of the test injection is substantially maintained throughout the preselected duration of the test injection and is substantially similar to an anticipated total volumetric flowrate of the fluid to be administered during at least a first phase of a diagnostic injection protocol. The method further includes performing a test scan of one or more regions of interest of the patient, determining a patient response function for the patient for each of the one or more regions of interest based, at least in part, on the enhancement output, and determining a diag- (Continued)

nostic injection protocol based at least in part upon the patient response function from each of the one or more regions of interest.

19 Claims, 10 Drawing Sheets

(56) References Cited

U.S. PATENT DOCUMENTS

| | | | |
|---|---|---|---|
| 5,687,208 | A | 11/1997 | Bae et al. |
| 5,840,026 | A | 11/1998 | Uber, III et al. |
| 6,055,985 | A | 5/2000 | Bae et al. |
| 6,339,718 | B1 | 1/2002 | Zatezalo et al. |
| 6,470,889 | B1 | 10/2002 | Bae et al. |
| 6,635,030 | B1 | 10/2003 | Bae et al. |
| 6,643,537 | B1 | 11/2003 | Zatezalo et al. |
| 6,673,033 | B1 | 1/2004 | Sciulli et al. |
| 6,767,319 | B2 | 7/2004 | Reilly et al. |
| 6,958,053 | B1 | 10/2005 | Reilly |
| 7,925,330 | B2 | 4/2011 | Kalafut et al. |
| 8,295,914 | B2 | 10/2012 | Kalafut et al. |
| 9,008,759 | B2 | 4/2015 | Kalafut et al. |
| 9,302,044 | B2 | 4/2016 | Kalafut et al. |
| 9,421,330 | B2 | 8/2016 | Kalafut et al. |
| 9,616,166 | B2 | 4/2017 | Kalafut et al. |
| 9,750,953 | B2 | 9/2017 | Kalafut |
| 9,949,704 | B2 | 4/2018 | Kalafut et al. |
| 9,959,389 | B2 | 5/2018 | Kalafut |
| 10,166,326 | B2 | 1/2019 | Kalafut et al. |
| 10,322,228 | B2 | 6/2019 | Fago et al. |
| 10,507,003 | B2 | 12/2019 | Uber, III et al. |
| 2006/0247519 | A1 | 11/2006 | Kawamoto |
| 2008/0253634 | A1* | 10/2008 | Hay ............... A61B 6/504 600/431 |
| 2010/0030073 | A1 | 2/2010 | Kalafut et al. |
| 2011/0313287 | A1 | 12/2011 | Komatsu et al. |
| 2013/0041257 | A1* | 2/2013 | Nemoto ............ A61B 6/507 600/432 |
| 2015/0182687 | A1* | 7/2015 | Kalafut ........ A61M 5/14546 600/432 |
| 2017/0258982 | A1 | 9/2017 | Kemper |
| 2017/0316562 | A1* | 11/2017 | Haberland ......... A61B 6/481 |
| 2020/0046895 | A1 | 2/2020 | Uber, III |
| 2020/0121860 | A1 | 4/2020 | Uber, III et al. |

OTHER PUBLICATIONS

Bae, K.T., et al., "Multiphasic Injection Method for Uniform Prolonged Vascular Enhancement at CT Angiography: Pharmacokinetic Analysis and Experimental Porcine Model," Radiology, vol. 216, Issue 3, pp. 872-880 (Sep. 2000).

Bae, K.T. et al, "Peak Contrast Enhancement in CT and MR Angiography: When Does it Occur and Why? Pharmacokinetic Study in a Porcine Model", Radiology, vol. 227, Jun. 2003, pp. 809-816.

Fleischmann, D. and Hittmair, K., "Mathematical analysis of arterial enhancement and optimization of bolus geometry for CT angiography using the discrete Fourier transform," Journal of Computer Assisted Tomography, vol. 23, Issue 3, pp. 474-484 (May/Jun. 1999).

"International Preliminary Report on Patentability from PCT Application No. PCT/US2020035699", Dec. 16, 2021.

Kawaguchi Naoto; et al, "Optimization of Coronary Attenuation in Coronary Computer Tomography Angiography Using Diluted Contrast Material", Circulation Journal—Official Journal of the Japanese Circulation Society, Mar. 2014, vol. 78.

Sandfort; et al, "An Optimized Test Bolus Contrast Injection Protocol for Consistent Coronary Artery Luminal Enhancement for Coronary CT Angiography", Academic Radiology, Mar. 2020, vol. 27; No. 3, 371-380.

\* cited by examiner

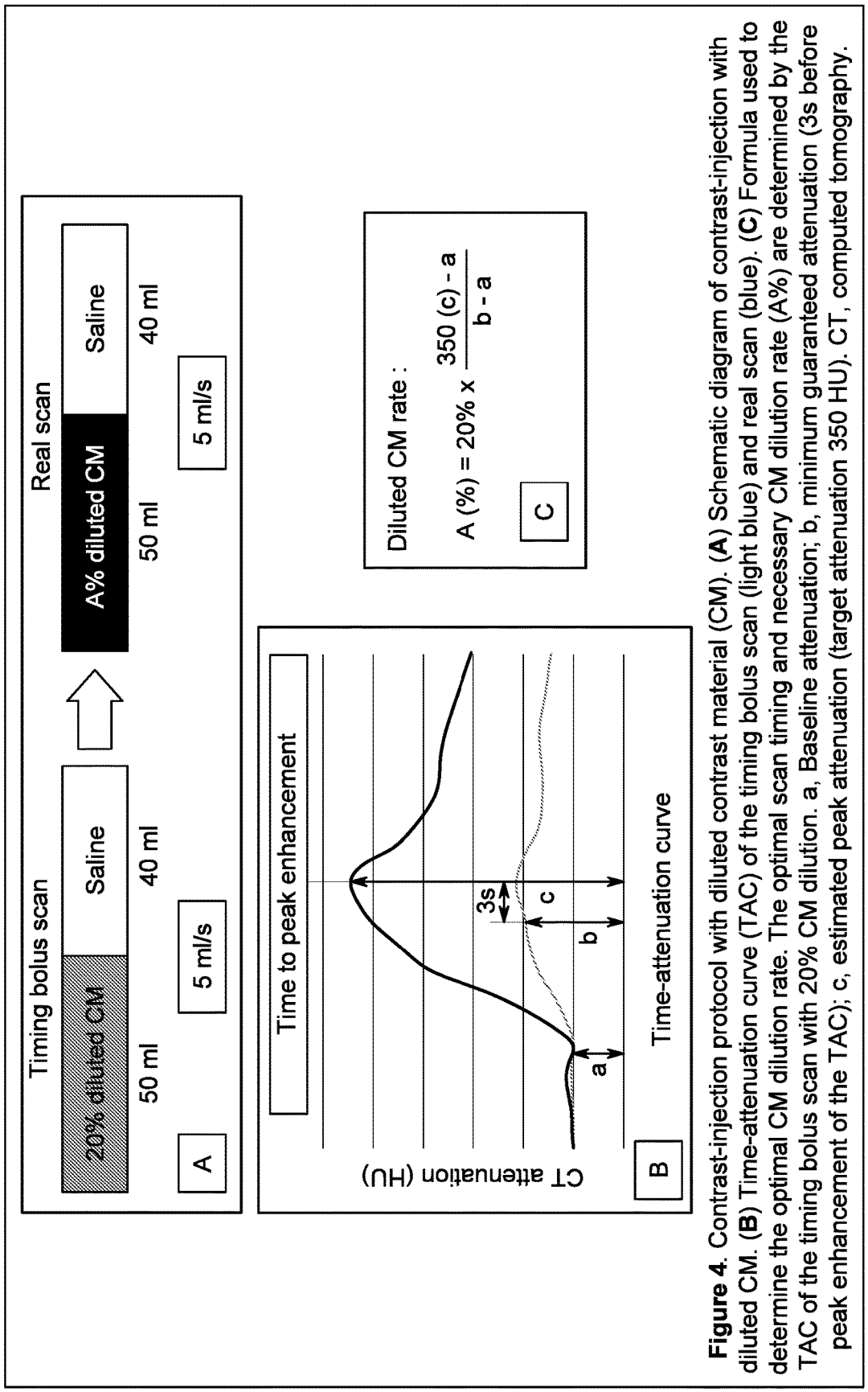

Figure 4. Contrast-injection protocol with diluted contrast material (CM). (A) Schematic diagram of contrast-injection with diluted CM. (B) Time-attenuation curve (TAC) of the timing bolus scan (light blue) and real scan (blue). (C) Formula used to determine the optimal CM dilution rate. The optimal scan timing and necessary CM dilution rate (A%) are determined by the TAC of the timing bolus scan with 20% CM dilution. a, Baseline attenuation; b, minimum guaranteed attenuation (3s before peak enhancement of the TAC); c, estimated peak attenuation (target attenuation 350 HU). CT, computed tomography.

FIG. 4
PRIOR ART

SYSTEM AND METHODS FOR DELIVERING A TEST BOLUS FOR MEDICAL IMAGING

CROSS REFERENCE TO RELATED APPLICATIONS

This application is a U.S. national phase application under 35 U.S.C. § 371 of PCT International Application No. PCT/US2020/035699, filed Jun. 2, 2020 and claims priority to U.S. Provisional Patent Application Ser. No. 62/856,931, filed Jun. 4, 2019, and to U.S. Provisional Patent Application Ser. No. 62/857,046, also filed Jun. 4, 2019, the entire contents of each of which are hereby incorporated by reference.

BACKGROUND

Field

This disclosure is related to systems and methods for fluid delivery, and, particularly, to systems and methods for delivery of a fluid to a patient, such as delivery of a contrast agent to a patient during a medical injection and/or imaging procedure in which the protocol used to deliver the fluid is developed, at least in part, through the administration of a test injection.

Description of Related Art

The following information is provided to assist the reader to understand the invention disclosed herein and the environment in which it will typically be used. The terms used herein are not intended to be limited to any particular narrow interpretation unless clearly stated otherwise in this document. References set forth herein may facilitate understanding of the present invention or the background of the present invention. The disclosure of all references cited herein are incorporated by reference.

It is often desirable to use a contrast agent to enhance images of a region of the body obtained through imaging procedures performed with medical imaging technologies such as, for example, computed tomography (CT), angiography, ultrasound, magnetic resonance imaging (MRI), nuclear medicine, and molecular imaging. Typically, the contrast agent is injected into a blood vessel of a patient and, once it flows to and reaches a desired concentration in the region of interest (ROI), the region is scanned by the imager according to the imaging procedure selected by the radiologist or other medical personnel. The resulting contrast-enhanced images of the patient, including the ROI, can then be viewed on a display associated with the imager itself or with another system such as a picture archiving and communication system (PACS) for purposes of reaching a diagnosis for and/or providing treatment to the patient.

The delivery of contrast agent is generally open-loop in the sense that the injection system does not incorporate knowledge or estimates of the drug's interaction with the physiology into its control scheme. Ideally, the injection system delivers exactly the amount of contrast agent programmed at the specified rate. This methodology works well when a scan takes a substantial amount of time so that the early pharmacokinetics of the drug does not influence the quality of the diagnostic scan. This methodology also works well when the object of the scan is an assessment of perfusion, that is drug uptake, into, for example, parenchyma or suspected carcinomas. Advances in scanning technology now enable the acquisition of images in very short time periods (seconds). This trend, coupled with the increasing desire to produce volumetric renderings of anatomical structures (like the heart, its coronary vasculature, and the great vessels leading to and from it), requires that the early pharmacokinetics and pharmacodynamics of the contrast be considered. Ideally, the attenuation curve produced by the presence of contrast agent in a large blood vessel is preferably uniform (flat) and sufficiently similar across regions of the patient to facilitate volumetric rendering and accurate diagnosis, and the imaging scan is timed to coincide with optimal contrast concentration in the region(s) of interest.

Differences in dosing requirements for different patients during imaging and other procedures have been recognized. For example, U.S. Pat. No. 5,840,026, assigned to the assignee of the present invention, the disclosure of which is incorporated herein by reference, discloses devices and methods to customize the injection to the patient using patient specific data derived before or during an injection. Although differences in dosing requirements for medical imaging procedures based upon patient differences have been recognized, conventional medical imaging procedures continue to use pre-set doses or standard delivery protocols for injecting contrast media during medical imaging procedures. Given the increased scan speed of recently available CT scanners including multidetector CT (MDCT) scanners, single phase injections are dominant over biphasic injections in regions of the world where such fast scanners are used. Although using fixed protocols (whether uniphasic, biphasic, multiphasic, or continuously varying) for delivery simplifies the procedure, providing the same amount of contrast media to different patients under the same protocol can produce very different results in image contrast and quality.

Some studies have attempted quantitative analyses of the injection process during CT angiography (CTA) to improve and predict arterial enhancement. For example, Bae and coworkers developed pharmacokinetic (PK) and dynamic models of the contrast behavior and solved the coupled differential equation system with the aim of finding a driving function that causes the most uniform arterial enhancement. K. T. Bae, J. P. Heiken, and J. A. Brink, "Aortic and hepatic contrast medium enhancement at CT. Part I. Prediction with a computer model," Radiology, vol. 207, pp. 647-55, 1998; K. T. Bae, "Peak contrast enhancement in CT and MR angiography: when does it occur and why? Pharmacokinetic study in a porcine model," Radiology, vol. 227, pp. 809-16, 2003, K. T. Bae et al., "Multiphasic Injection Method for Uniform Prolonged Vascular Enhancement at CT Angiography: Pharmacokinetic Analysis and Experimental Porcine Method," Radiology, vol. 216, pp. 872-880, 2000, U.S. Pat. Nos. 5,583,902, 5,687,208, 6,055,985, 6,470,889 and 6,635,030, the disclosures of which are incorporated herein by reference. An inverse solution to a set of differential equations of a simplified compartmental model set forth by Bae et al. indicates that an exponentially decreasing flow rate of contrast medium may result in optimal/constant enhancement in a CT imaging procedure.

Bae's PK approach for deriving uniform image enhancement relies upon many physiological parameters that may not be readily available to a clinician, such as central blood volume, diffusion rates, and cardiac output. Not having explicit measurements of cardiac output is a substantial drawback to Bae's approach, despite attempts to approximate the value based upon the patient's age, weight, and height. Furthermore, there is no consideration for implementation of the PK models in a controller framework. The injection profiles computed by inverse solution of the PK model are profiles not readily realizable by CT power injectors, without major modification. Moreover, the PK model of Bae does not consider the effects of pulsatile flow, vessel compliance, and local blood/contrast parameters (i.e., viscosity). The Bae approach has not caught on, most likely because given the change in volumetric flow rate over the course of the injection, the flow in the peripheral circulation varies and so the contrast delivery to the central circulation varies from what his model predicts and thus the results have not been consistent.

In some cases, the injection procedure begins with a test injection, or test bolus, in which a patient is given a small amount of contrast agent. The patient's response and then measurement of the enhancement in a particular slice, preferably in the region of interest or at least close to this region, is evaluated. In the case of CT scans, only a slice approximately 10 mm thick, generally orthogonal to the body axis, is measured, usually with a low X-ray dose. For CT angiographies this measurement usually takes place such that the enhancement is observed in a transverse section through the aorta at the heart. If other organs are to be examined, the measurement is accordingly carried out preferably in a slice in the vicinity of the respective organ, e.g. a transverse scan in the aorta near the liver in the case of a liver examination. The relevant aorta transverse section is then used as the ROI for the evaluation, and the accumulation of the contrast agent as a function of time is observed using the image data in this region. It is then attempted to distill a patient-specific contrast agent impulse response function from the thus determined patient-specific test bolus contrast agent behavior data. Using this patient function, the contrast agent behavior for a further contrast agent injection can then be predicted or, conversely, if a particular contrast agent behavior is desired, the injection protocol required for that purpose can be determined.

In the Journal of Computer Assisted Tomography. 23(3): 474-484, May/June 1999, the disclosure of which is incorporated herein in its entirety, Dominik Fleischmann and Karl Hittmair proposed the concept of using a test bolus to assess the patient response function for a patient. Using this patient function, they can then calculate an ideal bolus and from that an optimized realistic bolus to achieve the desired contrast optimization over the desired imaging duration.

However, it is not generally realized that in injection procedures in which the flow of the contrast is slowed down in the second phase (in this case with no saline), the flow of the fluid that has already been injected and is downstream of the intravenous (IV) catheter tip also slows down because the flow in the veins is the sum of the native or natural flowrate and the injected flowrate. This causes the shape of the contrast bolus to change downstream of the injection site and thus as it arrives in the heart. For example, FIG. 1 provides example details on anatomical variations in the circulatory system of the human body inclusive of the exemplary changes in the diameter of vessels in the human body as they lead to and approach the human heart. FIG. 2 provides a rudimentary model of the flow of fluid through the venous system, illustrating how the larger "pipes" closer to the heart accommodate increased flow. While an injected fluid flow added to the existing flow may be high enough to significantly change the flow in some vessels, it may not be enough to significantly change the flow in other vessels. As flow rate decreases, the flow downstream changes nearly instantaneously, but nonlinearly due in part to the fact that the venous system is comprised of "pipes" that can stretch or change volume depending on the magnitude of the flow. Consequently, in this prior art injection method, this changes the concentration of contrast in the blood at that location, and it also reduces the quality and consistency of the images taken of that ROI as they are now dependent upon the native flow in the patient's vessels and the vessel geometry. Fleischmann did not recognize that the injection flow rate significantly perturbs the flow in some of the vessels between the injection site, for example a forearm vein and the central circulation, and, for example the superior vena cava. Thus, the system in which his test bolus is delivered is not linearly related to the system in which the actual bolus is delivered. In addition, his actual bolus included changing contrast flow rates during the injection, which further causes unexpected changes in bolus shape in the central circulation. Thus, this approach would not yield consistent results from patient to patient. FIG. 3 is from this publication by Fleischmann and Hittmair.

In Optimization of Coronary Attenuation in Coronary Computed Tomography Angiography Using Diluted Contrast Material, (Circ J 2014; 78:662-670), the disclosure of which is incorporated herein in its entirety, Kawaguchi et al. teach the use of a test bolus that is identical to the imaging bolus in total volumetric flow rate, duration, and the timing of the transition from a contrast saline mixture to a pure saline flush. The test bolus differs only by having a relatively low concentration of contrast, for example 20%, than the imaging bolus. The test bolus is then used to determine the contrast concentration for the imaging bolus. They found that because the test bolus and the imaging bolus have the identical contrast and saline flush durations, the timing of enhancement during the test bolus may be used to determine the optimal times to scan using the imaging bolus. The imaging bolus is identical to the test bolus, just scaled by the increased contrast concentration in the contrast phase. FIG. 4 is from this publication by Kawaguchi et al.

SUMMARY

In one non-limiting embodiment, the present disclosure is directed to a method of determining a diagnostic injection protocol for administering a medical fluid comprising a contrast agent to a patient in connection with a diagnostic imaging procedure. The method includes a step of administering a test injection into the patient at a preselected total volumetric flowrate for a preselected duration, wherein the test injection is comprised of a volumetric amount of a contrast agent and, optionally, a volumetric amount of a flush fluid, wherein the preselected total volumetric flowrate of the test injection is substantially maintained throughout the duration of the test injection, and wherein the preselected total volumetric flowrate is substantially similar to an anticipated total volumetric flowrate of the fluid to be administered during at least a first phase of the diagnostic injection protocol. The method also includes a step of performing a test scan of one or more regions of interest of the patient as the test injection propagates therethrough to obtain scan data resulting therefrom. The method can also include a step of determining from the scan data an enhancement output from each of the one or more regions of interest at one or more points in time as a result of the propagation of the test injection therethrough. In addition, the method includes a step of determining a patient response function for the patient for each of the one or more regions of interest based, at least in part, on the enhancement output. The method can also include a step of determining the diagnostic injection protocol based at least in part upon the patient response function from at least one of the one or more regions of interest, wherein a first phase of the diagnostic injection protocol comprises administering the fluid at a total volumetric flowrate that is substantially similar to the preselected total volumetric flowrate of the test injection. If the response to the test injection of a region of the patient is measured but is not used in the computation of a patient response function for the region of the patient itself and/or for another region of the patient, then it may be considered to be a region of the patient and not a region of interest as used herein.

In other non-limiting embodiments, the present disclosure is directed to a fluid delivery system and/or system for patient imaging that include a fluid administration device and/or imager system capable of performing the method described above. Various aspects of the present disclosure may be further characterized by one or more of the following clauses:

- Clause 1: A method of determining a diagnostic injection protocol for administering a medical fluid comprising a contrast agent to a patient in connection with a diagnostic imaging procedure, the method comprising: (a) administering a test injection into the patient at a preselected total volumetric flowrate for a preselected duration, wherein the test injection is comprised of a volumetric amount of a contrast agent and, optionally, a volumetric amount of a flush fluid, wherein the preselected total volumetric flowrate of the test injection is substantially maintained throughout the preselected duration of the test injection, and wherein the preselected total volumetric flowrate is substantially similar to an anticipated total volumetric flowrate of the fluid to be administered during at least a first phase of the diagnostic injection protocol; (b) performing a test scan of one or more regions of interest of the patient as the test injection propagates therethrough to obtain scan data resulting therefrom; (c) determining from the scan data an enhancement output from each of the one or more regions of interest at one or more points in time as a result of the propagation of the test injection therethrough; (d) determining a patient response function for the patient for each of the one or more regions of interest based, at least in part, on the enhancement output; (e) determining the diagnostic injection protocol based at least in part upon the patient response function from at least one of the one or more regions of interest, wherein a first phase of the diagnostic injection protocol comprises administering the fluid at a total volumetric flowrate that is substantially similar to the preselected total volumetric flowrate of the test injection.
- Clause 2: The method of clause 1, further comprising: administering a diagnostic injection into the patient according to the diagnostic injection protocol.
- Clause 3: The method of clause 2, wherein a total duration of any contrast-containing phases of the test injection is no more than 80% of a total duration of any contrast-containing phases of the diagnostic injection.
- Clause 4: The method of clause 2 or clause 3, wherein administering the diagnostic injection into the patient comprises: delivering, during a first duration of the diagnostic injection protocol, a volume of the medical fluid at a total volumetric flowrate, wherein the total volumetric flowrate is substantially similar to the preselected total volumetric flowrate of the test injection.
- Clause 5: The method of any of clauses 1-4, wherein the one or more regions of interest include at least two regions of interest.
- Clause 6: The method of any of clauses 1-5, wherein the test injection comprises a first phase, wherein a fluid administered during the first phrase of the test injection consists entirely of the flush fluid.
- Clause 7: The method of clause 6, wherein the test injection comprises a second phase that follows the first phase, wherein a fluid administered during the second phase of the test injection comprises the contrast agent.
- Clause 8: The method of clause 7, wherein the fluid administered during the second phase of the test injection further comprises the flush fluid.
- Clause 9: The method of clause 7 or clause 8, wherein the fluid administered during the second phase of the test injection comprises at least 50% by volume of the contrast agent.
- Clause 10: The method of any of clauses 7-9, wherein the test injection comprises a third phase that follows the second phase, wherein a fluid administered during the third phase of the test injection consists entirely of the flush fluid.
- Clause 11: The method of any of clauses 1-10, wherein a final phase of the test injection comprises administering a fluid that consists entirely of the flush fluid.
- Clause 12: The method of any of clauses 1-11, wherein the preselected total volumetric flowrate of the test injection is between about 0.5 mL/s and about 10 mL/s.
- Clause 13: The method of any of clauses 1-12, wherein the preselected total volumetric flowrate of the test injection is between about 1 mL/s and about 7 mL/s.
- Clause 14: The method of any of clauses 1-13, wherein the preselected duration of the test injection is between about 5 and about 50 seconds.
- Clause 15: The method of any of clauses 1-14, wherein the preselected duration of the test injection is between about 5 and about 20 seconds.
- Clause 16: The method of any of clauses 1-15 wherein a timing to perform the test scan is determined based upon at least one of the following: information about an imager system to be used to perform the test scan, the one or more regions of interest, and movement capability of the imager system.
- Clause 17: The method of any of clauses 1-16, where the test injection is administered by an injector and the test scan is performed by the imager system.
- Clause 18: The method of clause 17, further comprising transferring at least one of the scan data and the enhancement output from the imager system to the injector through a data capture method comprising taking a photograph of a user interface of the imager system, processing the photograph to extract portions of the at least one of the scan data and the enhancement output, and transferring the extracted portions of the at least one of the scan data and the enhancement output to the injector.
- Clause 19: A fluid delivery system, comprising: a fluid administration device adapted to deliver to a patient a test injection and a diagnostic injection, wherein each injection comprises a volumetric amount of a contrast agent and, optionally, a volumetric amount of a flush fluid; and a processor and non-transitory machine-readable storage medium, wherein the non-transitory machine-readable storage medium comprises programming instructions that, when executed by the processor, enable the fluid administration device to: administer the test injection at a preselected total volumetric flowrate for a preselected duration, wherein the preselected total volumetric flowrate is substantially maintained throughout the preselected duration of the test injection, and wherein the preselected total volumetric flowrate is substantially similar to an anticipated total volumetric flowrate of at least a first phase of the diagnostic injection; receive scan data from a test scan of one or more regions of interest of the patient, wherein the test scan is performed as the test injection propagates through the patient; determine from the scan data an enhancement output from each of the one or more regions of interest at one or more points in time as a result of the propagation of the test injection through the patient; determine a patient response function for the patient for each of the one or more regions of interest based, at least in part, on the enhancement output; and determine a diagnostic injection protocol, based at least in part, upon the patient response function from at least one of the one or more regions of interest.

Clause 20: The fluid delivery system of clause 19, further comprising a source of the contrast agent and a source of the flush fluid.

Clause 21: The fluid delivery system of clause 19 or clause 20, wherein the one or more regions of interest include at least two regions of interest.

Clause 22: A system for patient imaging, comprising: a fluid administration device adapted to deliver to a patient a test injection and a diagnostic injection, wherein each injection comprises a volumetric amount of a contrast agent and, optionally, a volumetric amount of a flush fluid; an imager system adapted to perform an imaging scan of the patient; and a processor and non-transitory machine-readable storage medium, wherein the non-transitory machine-readable storage medium comprises programming instructions that, when executed by the processor, enable the system to: administer, by the fluid administration device, the test injection at a preselected total volumetric flowrate for a preselected duration, wherein the preselected total volumetric flowrate is substantially maintained throughout the preselected duration of the test injection, and wherein the preselected total volumetric flowrate is substantially similar to an anticipated total volumetric flowrate of at least a first phase of the diagnostic injection; generate scan data from a test scan performed by the imager system of one or more regions of interest of the patient as the test injection propagates through the patient; determine from the scan data an enhancement output from each of the one or more regions of interest at one or more points in time as a result of the propagation of the test injection through the patient; determine a patient response function for the patient for each of the one or more regions of interest based, at least in part, on the enhancement output; and determine a diagnostic injection protocol based, at least in part, upon the patient response function from at least one of the one or more regions of interest.

Clause 23: The system of clause 22, further comprising a source of the contrast agent and a source of the flush fluid.

Clause 24: The system of clause 22 or clause 23, wherein the fluid administration device is configured to determine the diagnostic injection protocol for the diagnostic injection.

Clause 25: The system of clause 22 or clause 23, wherein the imager system is configured to determine the diagnostic injection protocol for the diagnostic injection.

Clause 26: The system of clause 22 or clause 23, further comprising a cloud-based computing platform that is accessible by the fluid administration device and/or the imager system, wherein at least a portion of the programming instructions reside on the cloud-based computing platform.

Clause 27: The system of any of clauses 22-26, further comprising a data capture device configured to take a photograph of a user interface of the imager system and transfer the photograph or extracted portions thereof to the fluid administration device.

BRIEF DESCRIPTION OF THE DRAWINGS

FIG. 4 is an illustration summarizing a methodology described in Kawaguchi et al.

DETAILED DESCRIPTION

Figure 1:
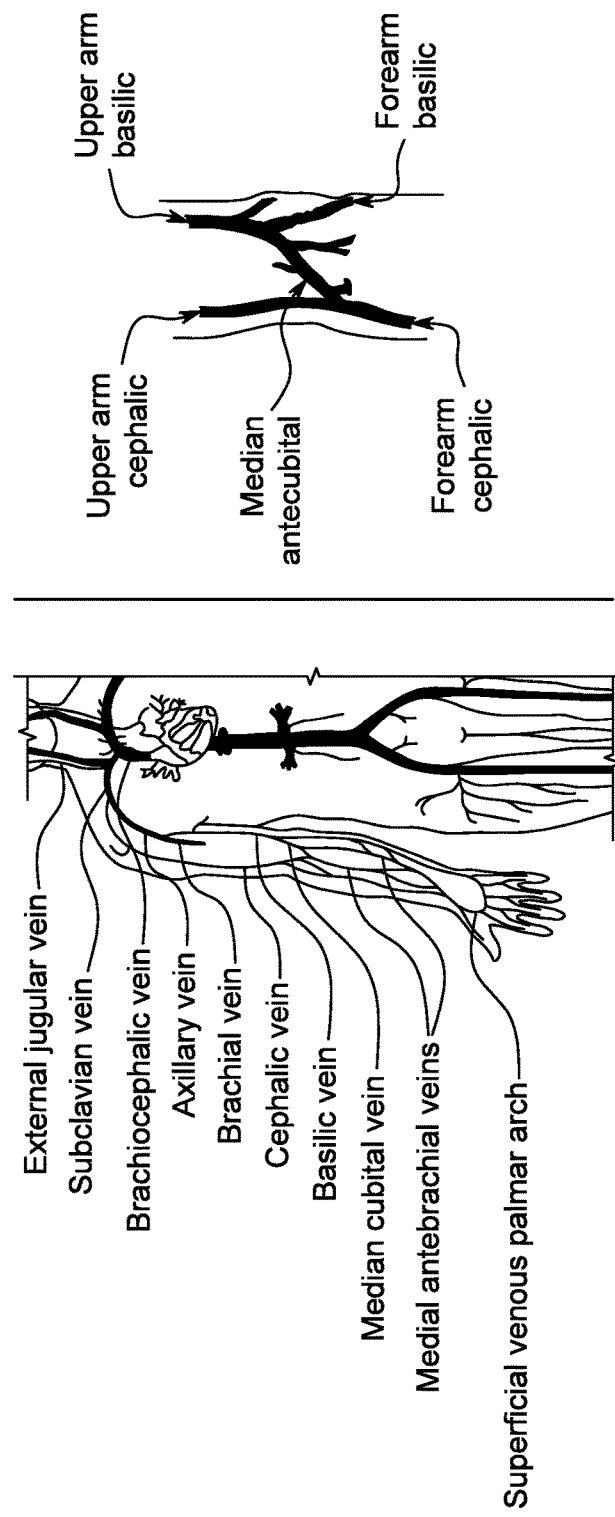
FIG. 1 is an illustration of the human body circulatory system and exemplary sizes of different portions thereof.
Figure 2:
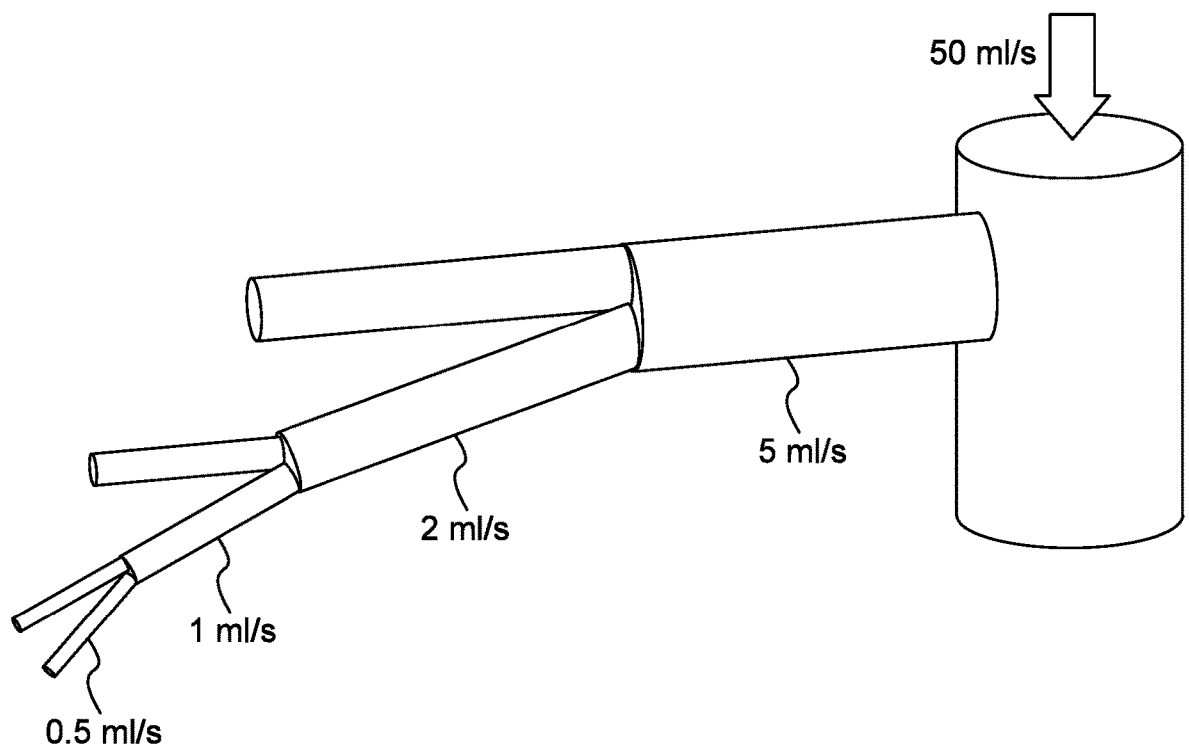
FIG. 2 is an illustration of a model of the venous system showing an example of how the flowrates in different portions thereof can vary.

For purposes of the description hereinafter, spatial orientation terms shall relate to the embodiment as it is oriented in the drawing figures. However, it is to be understood that the various embodiments of this disclosure may assume alternative variations and step sequences, except where expressly specified to the contrary. It is also to be understood that the specific devices and processes illustrated in the attached drawings, and described in the following specification, are simply exemplary. Hence, specific dimensions and other physical characteristics related to the embodiments disclosed herein are not to be considered as limiting.

As used in the specification, the singular form of "a", "an", and "the" include plural referents unless the context clearly dictates otherwise.

Unless otherwise indicated, all ranges or ratios disclosed herein are to be understood to encompass any and all subranges or sub-ratios subsumed therein. For example, a stated range or ratio of "1 to 10" should be considered to include any and all subranges between (and inclusive of) the minimum value of 1 and the maximum value of 10; that is, all subranges or sub-ratios beginning with a minimum value of 1 or more and ending with a maximum value of 10 or less, such as but not limited to, 1 to 6.1, 3.5 to 7.8, and 5.5 to 10.

All documents, such as but not limited to issued patents and patent applications, referred to herein, and unless otherwise indicated, are to be considered to be "incorporated by reference" in their entirety.

According to one aspect of this disclosure, a method of determining a diagnostic injection protocol is described. As used herein with respect to a fluid delivery procedure, the term "protocol" refers to a group of parameters such as flow rate, flow volume, delivery duration, etc. that define the amount of fluid(s) to be delivered during a fluid delivery procedure, such as to a patient during an injection procedure. Such parameters can change over the course of the procedure.

According to one aspect of this disclosure, the determination of a diagnostic injection protocol relies upon, at least in part, information learned from a test injection that occurs prior to the diagnostic injection. As is generally understood, a test injection, or test bolus, is an injection of a volume of medical fluid to a patient that occurs prior to a diagnostic injection. The test injection may or may not include a volume of contrast, and a test injection can provide patient-specific information that can then be used to better model the diagnostic injection and/or accompanying medical imaging procedure, including information regarding the patient's physical response to receiving the injection of a medical fluid as well as the manner and rate at which the medical fluid propagates through the system fluid path and/or through the patient.

Once appropriately designed, such as through the use of information learned from the test injection, the diagnostic injection can then proceed. The diagnostic injection represents an injection of medical fluid into a patient, and the medical fluid may, and typically does, include contrast. The diagnostic injection may, and typically does, involve the administration of a similar or larger volume of medical fluid, and a larger volume of contrast, to the patient than the test injection. Upon administering the diagnostic injection to the patient, an appropriately timed medical imaging scan of the patient, such as a CT scan, can occur to gather medical images of one or more regions of interest of the patient, and these images can then be analyzed by medical personnel to help diagnose one or more medical conditions of the patient. The contrast may provide a positive or a negative signal (increase or decrease) or other change in an imaging characteristic or property which may be sensed or detected by the imaging equipment.

According to certain non-limiting embodiments, the method of determining a diagnostic injection protocol according to this disclosure includes administering a test injection of a volumetric amount of a medical fluid into the patient at a preselected total volumetric flowrate for a preselected duration. The term "duration" is used to refer to any period of time of the fluid delivery procedure and can refer to the entire fluid delivery procedure (e.g., the "duration" of the test injection can refer to the entire test injection). The term "preselected" is intended to refer to a value that is determined or selected in advance of the injection or a duration thereof. For example, a "preselected" flowrate can be a flowrate that is programmed into an injection device which the injection device then implements to administer the injection.

The medical fluid administered during the test injection can include contrast, such as a contrast agent, multiple contrast agents, or one contrast agent at different concentrations. Contrast agents are known in the art and are commonly utilized in medical procedures that involve medical imaging, such as CT imaging procedures. The medical fluid administered during the test injection can additionally include one or more flush fluids. One non-limiting example of a flush fluid is saline, though other exemplary flush fluids would be known to one of skill in the art upon reading the present disclosure.

As discussed further below, the medical fluid administered during the test injection can vary in its composition during the test injection. For example, over certain time periods of the test injection, the medical fluid being administered may be comprised of only flush fluid. Over other time periods of the test injection, the medical fluid being administered may be comprised of only contrast. Over still other time periods of the test injection, the medical fluid being administered may be comprised of a mixture of contrast and flush fluid, and the relative ratio of contrast and flush fluid may vary as well. In this sense, the test injection may proceed in "phases" of limited duration where each "phase" represents a change in the composition of the medical fluid being administered. As used herein, the term "phase" refers generally to a group of parameters that define the amount of fluid(s) to be delivered during a period of time (or phase duration) that can be less than the total duration of the fluid delivery procedure. A "duration" may be, in some instances, equivalent to a phase, though it may also be used to refer to a more limited, or less limited, period of time. Thus, the parameters of a phase or a duration provide a description of the fluid delivery over a time instance corresponding to the length of time of the phase or the duration. Generally, a phase refers to a portion of an injection with a consistent mathematical description of the injection, for example a relatively constant volumetric flow of contrast and saline over the duration of the phase. As used herein, the term "phase" also includes any discretely changing or continuously changing group of parameters that define the amount of fluid(s) to be delivered during a period of time, the phase duration, for example constants, linear phase (ramps), polynomial, and exponentials. A new phase commonly indicates a significant change in one or more of the delivery related parameters. Phases are used for human understanding and descriptive simplicity.

The medical fluid is administered to the patient during the test injection at one or more "flowrates." The term "flowrate" is used herein consistent with its ordinary meaning and refers to the volume per unit of time at which the medical fluid is delivered. For purposes of this disclosure, the flowrate of a medical fluid can be expressed in terms of the total flowrate (e.g., the total amount of fluid delivered per unit of time). In instances where the medical fluid is comprised of more than one type of fluid (e.g., a first fluid, such as contrast, and a second fluid, such as saline), the flowrate can also be expressed in terms of the individual flowrates of each of the constituent fluids. For example, if a total volumetric flowrate of a fluid comprised of equal parts contrast and saline is 8 mL/s, the flowrate can be expressed as 4 mL/s of contrast and 4 mL/s of saline.

In certain non-limiting embodiments, the total volumetric flowrate of the test injection is a substantially consistent total volumetric flowrate over the entire duration of the test injection. In other words, the total volumetric flowrate is maintained at substantially the same value throughout the test injection. The total volumetric flowrate value that is maintained can be a preselected value that is selected in advance of initiating the test injection. For purposes of this disclosure, a "substantially consistent total volumetric flowrate" means that the fluid volume per unit time remains constant over the timeframe within a target margin of variation. An exemplary target may be a margin of variation of less than 20% by volume, such as less than 10% or less than 5% by volume. The specific numeric value may depend upon the injection flow rate in relation to the patient's peripheral vessel flowrates.

Figure 5A:
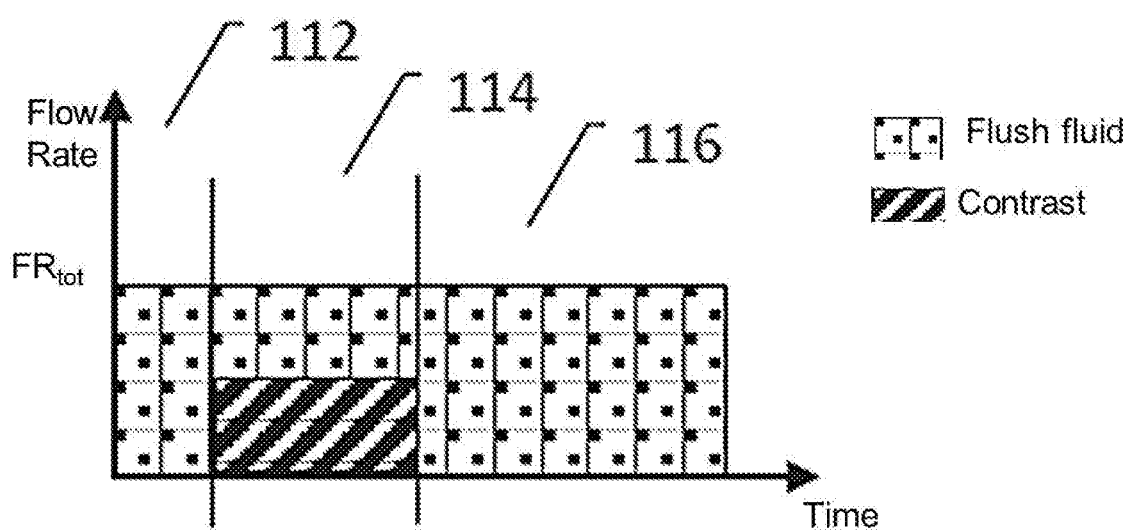
FIG. 5A is a graphical representation of an injection profile of a test injection in which a consistent total volumetric flowrate is maintained through the test injection according to one non-limiting embodiment of the present disclosure.

In some non-limiting embodiments, the medical fluid that is administered in the test injection includes contrast and flush fluid, and the flowrate of each of these constituent fluids can vary over the duration of the test injection. If the flowrate of contrast and/or flush fluid varies during the test injection (including points where the amount of contrast is zero), maintaining a substantially consistent total volumetric flowrate of a fluid volume that includes both contrast and a flush fluid requires varying the rate at which the flush fluid is delivered in a manner that is complementary to the variation in the flow of contrast. One example of a flow profile for a test injection according to certain non-limiting embodiments of this disclosure is shown in FIG. 5A. In FIG. 5A, a first phase 112, which may have a duration of, for example, 1-4 seconds, such as 2-3 seconds, can include administration of a medical fluid having only flush fluid (i.e., 100% by volume flush fluid; no contrast) at a total volumetric flowrate ($FR_{tot}$). This first, pure flush fluid phase may act to fill the venous system of the patient. In the embodiment of FIG. 5A, first phase 112 is then followed by second phase 114. In second phase 114, the medical fluid administered includes contrast (dark shading) either alone or in combination with flush fluid, for example as an admixture of contrast and flush fluid. The medical fluid administered in second phase 114, which may have a duration of, for example, 2-6 seconds, such as 3-5 seconds, can include a significant relative volume of contrast, such as 50-100% by volume of contrast or 75-100% by volume of contrast. In FIG. 5A, the medical fluid of second phase 114 includes an approximately 50:50 volumetric ratio of contrast to flush fluid. The total volumetric flowrate ($FR_{tot}$) of medical fluid during second phase 114 can be substantially the same total volumetric flowrate ($FR_{tot}$) as in the first phase. A third phase 116 which may have a duration of, for example, 3-10 seconds, such as 4-8 seconds, may follow second phase 114 and may involve the administration of a medical fluid that is pure flush fluid (100% by volume flush fluid). The total volume of flush fluid administered during third phase 116 can be of sufficient volume to ensure that the contrast is delivered without significant slowdown to the central circulation. As an example, the total flush fluid delivered in third phase 116 can be greater than 20 mL, such as greater than 30 mL. The total volumetric flowrate of third phase 116 can again be substantially the same total volumetric flowrate ($FR_{tot}$) as in the first phase 112 and second phase 114. As depicted in FIG. 5A, the total volumetric flowrate ($FR_{tot}$) of medical fluid remains substantially consistent throughout the entire duration of the test injection.

FIG. 5A represents one non-limiting embodiment of a test injection according to this disclosure, and variations thereof are contemplated and considered to be within the scope of this disclosure. For example, the test injection may be comprised of only two phases, where the first phase involves the administration of a medical fluid that includes a significant (e.g., 50-100% by volume) relative amount of contrast and the second phase involves the administration of a pure flush fluid (100% by volume flush fluid). The test injection may also be comprised of multiple contrast-containing phases, such as a second phase comprised of a first relative amount of contrast (e.g., 50-75% by volume) and a third phase comprised of a higher relative amount of contrast (e.g., 75-100% by volume). If more than one contrast-containing phase is included, there may also be a pure flush fluid phase (e.g., 100% by volume) that occurs between the two contrast-containing phases. One or more phases of the injection may have a contrast to flush ratio that changes as a function of time, for example linearly ramping from one level to another (e.g., 0% to 40%) or follows a more complex profile, such as an exponential decay or a polynomial curve. As mentioned, a flush fluid, such as saline, can make up any difference between the flowrate of contrast during a given phase and the total volumetric flowrate ($FR_{tot}$) that is maintained throughout the duration of the test injection such that the total volumetric flowrate ($FR_{tot}$) throughout the test injection remains substantially consistent.

For reasons that will become apparent below, the total volumetric flowrate ($FR_{tot}$) of the test injection should be significant. In certain non-limiting embodiments, the total volumetric flowrate ($FR_{tot}$) of the test injection that is substantially maintained is from about 0.5 mL/s to about 10 mL/s, such as from about 1 mL/s to about 7 mL/s. Selection of a particular flowrate can vary depending on the particulars of the patient, including the patient's size, age, sex, and health conditions.

The duration of the test injection and the phases thereof are also not particularly limited, and non-limiting examples of phase durations are provided above. The overall duration of the test injection can be, for example, between 5 and 50 seconds, such as between 5 and 20 seconds or between 5 and 10 seconds, depending on the flowrate and total volume of fluid that is to be delivered.

The total volumetric flowrate ($FR_{tot}$) can be selected such that it is substantially similar to an anticipated total volumetric flowrate of the medical fluid to be administered during at least a first phase of a diagnostic injection that will follow the test injection. For purposes of this disclosure, the total volumetric flowrate ($FR_{tot}$) of the test injection is considered to be "substantially similar" to an anticipated total volumetric flowrate of the fluid to be administered during at least a first phase of the diagnostic injection if the difference between the two values is within a target margin of variation. An exemplary target may be a margin of variation of less than 20% by volume, such as less than 10% or less than 5% by volume.

Utilizing a test injection that maintains a substantially consistent total volumetric flowrate ($FR_{tot}$) that is substantially similar to the anticipated total volumetric flowrate during at least the onset of the diagnostic injection can provide certain advantages. For example, because the total volumetric flowrate remains substantially similar between the test injection and the diagnostic injection, information learned during the test injection, including the time for a volume of contrast to reach one or more regions of interest, is expected to be more accurate. One reason for this is that a similar flowrate between the two injections can better account for the effect of perturbation within the circulatory system. For example, if the flow rates and volumes of the test injection are small enough that the test injection does not perturb or modify the natural blood flow rate in the vein, the injected fluid is quickly slowed down to the blood flow rate and is carried to the central vasculature at the speed of the blood flow, thereby affecting the timing for the test injection to reach different regions of interest. However, if the diagnostic injection then utilizes higher flow rates and volumes such that significant perturbation within the circulatory system occurs, the rate at which the medical fluid of the diagnostic injection reaches the regions of interest may be shorter than in the test injection due to the increased flowrate created by the perturbation, and therefore the timing information derived from the test injection (e.g., time to peak enhancement) may not accurately predict the timing of the same event during the diagnostic injection. Applying a substantially consistent volumetric flowrate for the duration of the test injection, and then maintaining a similar volumetric flowrate for at least the first phase of the diagnostic injection can help normalize the timing information between the test injection and the diagnostic injection.

Unlike in the work of Kawaguchi et al., discussed in the Background above, the test injection of the present disclosure is preferably shorter than the anticipated diagnostic injection. In some non-limiting embodiments, at least the contrast containing portion(s) or phases of the test injection is (or are collectively if more than one such portion/phase exists) significantly shorter than the contrast containing portion(s) or phases of the diagnostic injection. For example, the total duration of all contrast containing portions/phases of the test injection can be 80% or less, such as 50% or less, of the total duration of all contrast containing portions/phases of the diagnostic injection. In some non-limiting embodiments, some computation beyond proportionality, as discussed in Kawaguchi, is involved in computing the diagnostic injection protocol from the results measured from the imaging of the test injection. Example algorithms include deconvolution, convolution, Fourier series, and determination of a step response function or an impulse response function for the injection system and/or patient, as discussed further below. The teachings of this disclosure may enable the use of a test injection with less total contrast volume than the work of Kawaguchi et al. This may also enable the use of a higher concentration over the shorter time, enabling the enhancement during the test injection to be more readily distinguished from background and/or noise in the regions of interest.

The anticipated total volumetric flowrate of the fluid to be administered during at least a first phase of the diagnostic injection protocol can be determined in a variety of ways. For example, the anticipated total volumetric flowrate of the fluid to be administered during at least a first phase of the diagnostic injection protocol, along with other variables and parameters associated with the diagnostic injection protocol, can be populated within a phase programming mechanism based on one or more parameters of interest, including, for example, but not limited to, contrast agent concentration (for example, iodine concentration in the case of a CT procedure), a patient parameter (for example, body weight, body mass index (BMI), height, gender, age, measured or estimated cardiac output, etc.) the type of scan being performed, and the type of catheter inserted into the patient for intravascular access. By way of example, U.S. Pat. No. 9,302,044, assigned to the assignee of the present invention, the disclosure of which is incorporated herein by reference, discloses a parameter generation system and method to determine parameters (including total volume and flowrate) of at least one phase of an injection procedure based, at least in part, upon a type of the injection procedure and physiological details of the patient. The parameter generation system and method can determine the amount of a pharmaceutical that is to be delivered to a patient, at least in part, on the basis of the concentration of an agent in the pharmaceutical and, at least on part, on the basis of a function that depends upon and varies with a patient parameter. Such a procedure can be used here to determine or at least approximate an anticipated total volumetric flowrate of the fluid to be administered during at least a first phase of the diagnostic injection protocol, which information can be used in setting the total volumetric flowrate ($FR_{tot}$) that can be maintained throughout the test injection.

By way of further example, U.S. Pat. No. 7,925,330, assigned to the assignee of the present invention, the disclosure of which is incorporated herein by reference, discloses a parameter generation system and method to determine parameters (including total volume and flowrate) of at least one phase of an injection procedure based at least in part upon a type of the injection procedure and physiological details of the patient. The operator can be presented with a choice of the type of algorithm the operator would like the system to use to produce a set of flow rates and volumes for that patient. Such a procedure can be used here to determine or at least approximate an anticipated total volumetric flowrate of the fluid to be administered during at least a first phase of the diagnostic injection protocol.

The anticipated total volumetric flowrate of the fluid to be administered during at least a first phase of the diagnostic injection protocol can also be determined or at least estimated based upon historical data, including data about past procedures involving the same patient or similar patients (e.g., patients of similar height, weight, age, sex, etc.) and/or involving the same or similar diagnostic purpose (e.g., cardiac image, etc.).

By way of further example, the anticipated total volumetric flowrate of the fluid to be administered during at least a first phase of the diagnostic injection protocol may be determined through any of the procedures described in U.S. Patent Application Publication No. 2020/0046895, assigned to the assignee of the present invention, the disclosure of which is incorporated herein by reference. U.S. Patent Application Publication No. 2020/0046895 describes an injection protocol having a substantially consistent total volumetric flowrate of medical fluid that is maintained throughout the injection or at least a first duration thereof.

While the actual volumetric flowrate of the fluid that is administered during at least a first phase of the diagnostic injection protocol may differ to some extent from the anticipated value, it is expected that any such variations are likely to be minor (e.g., a variation of less than 10%, such as less than 5%). For example, based upon information learned from the test injection, modifications may be made to the diagnostic injection protocol in order to tailor the diagnostic injection protocol to the particular patient. These changes are not likely to require a significant modification to the flowrate of the first phase of the diagnostic injection that is estimated through the procedures referenced herein. Thus, the anticipated volumetric flowrate for at least the first phase of the diagnostic injection is believed to constitute a reasonable and reliable estimate of what the actual flowrate during that phase will be. For the reasons explained above, maintaining consistency in the total volumetric flowrate between the test injection and at least the first phase of the diagnostic injection can provide certain advantages.

Once designed, the test injection can be administered to the patient. Before beginning the test injection, a patient access line can be created in the patient through which the test injection (and any subsequent injections) can be administered. A small volume of flush fluid can be administered to confirm the sufficiency of the access line prior to the test injection. As a further benefit, because the test injection is being performed at the anticipated diagnostic injection flow rate, the test injection may additionally be used as an indication of or to confirm sufficiency of the venous access for the diagnostic injection. As a further benefit, the test injection with a known fluid or fluids may also be used to assess the impedance of the system up to and including the catheter, needle, or other final fluid path element used to deliver the fluid into the patient's vein. The impedance may be assessed by measuring the flows, pressures, and piston movements over time in combination with known system characteristics. Reasons to measure impedance and uses of the measured impedance are known to those skilled in the art, for example as discussed in United States Patent Application Publication No. 2020/0121860 and U.S. Pat. No. 9,616,166 both assigned to the assignee of the present invention, the disclosures of which are incorporated herein by reference.

Subsequent to administering the test injection, an imaging scan of the patient, known as a "test scan," can be performed to measure the response of the patient to the test injection. The imaging scan can be performed by a medical imager system such as a CT, MR, ultrasound, or other known imaging systems, such as those useful in dynamic studies that rely upon scan timing. To prepare the patient for the imaging (diagnostic) scan, the patient can be positioned with respect to the imager system and the imager system can be readied. The imager system may be adjusted to the patient by, for example, completing a scout scan, and the scan timing can be approximated based on the regions of interest that will be the subject of the study. Optionally, non-contrast-aided images can be acquired.

The test scan can generate scan data indicative of the patient's response over time to the test injection in one or more regions of interest (ROIs). These ROIs may be different regions in a single scan position, or the patient many need to be moved to multiple scan positions as the test injection bolus travels through their body. Using the art described in U.S. Pat. No. 9,436,989, which is incorporated herein by reference, the bolus shape of the test injection may be used to facilitate this, for example by having a test bolus which is somewhat longer than might be used for first pass imaging. Alternatively, the regions of interest may be such that they are naturally separated by the body's circulation delays, for example the peripheral circulation in the legs. In this example, the test injection bolus may be "chased" down the body from the thorax through the legs in a continuous or in a "two steps forward, one step backward" oscillating path to enable the peak of the contrast bolus to be measured or estimated. The scan data can be, for example, data reflecting the contrast enhancement (e.g., in terms of Hounsfield Units HU) at different times in one or more (e.g., two or three) regions of interest. Non-limiting examples of regions of interest that can be the subject of the test scan include the aorta, the coronary arteries, the pulmonary artery, cardiac and/or pulmonary tissue perfusion, heart ventricles, or other organs.

From this scan data, an enhancement output of the patient at each ROI can be determined. The enhancement output can be, for example, a measure of the increase in enhancement (AHU) over time in the region(s) of interest and may additionally include information such as the time to peak enhancement and the peak enhancement value at different regions of interest, as the test injection fluid travels through the patient. Hounsfield units are generally linearly related to iodine concentration in the region or interest, with the slope of the linear relationship being a function of the imaging parameters, for example kVp and spectrum shape of the X-ray tube. Alternatively, the scan data may reflect the contrast's effect on T1 or T2 values in MRI imaging which has a generally non-linear relationship to the contrast concentration and other parameters of the region of interest. This imaging protocol specific relationship between contrast concentration and image enhancement may be used in the design of the bolus shape to achieve a desired image enhancement over the ROI and the key portions of the scan time, for example the center of k-space during MRI acquisitions.

In hybrid or combination imaging modalities, for example PET/MR or PET/CT, a single high flow test injection may be utilized to design diagnostic injections for each of the imaging modalities. The design of the one or more diagnostic injections may account for the concentration and timing requirements of the one or more specific imaging modalities, which of course may differ from modality to modality due to the different physical phenomena involved in the imaging process. However, as long as the patient function is not significantly perturbed, the information derived from one test injection may be used as input for the computation of one or more diagnostic injections. The same applies to diagnostic injections with a single imaging modality where the image acquisitions are separated by enough time that a second full diagnostic injection is needed, but a short enough time separation, for example less than 30 minutes and preferably less than 20 minutes, such that the patient function is not likely to have changed significantly.

The scan protocol used to measure the responses of the one or more ROIs may be the same or different than that which is to be used for the diagnostic imaging scan itself. For example, in CT it may be a lower dose scan or done at a lower kV, which might not provide a good enough image quality for a diagnostic scan but is sufficient to measure contrast concentrations in the ROIs. Something similar to this is done in the current CT bolus tracking which is used for providing timing information during imaging. As a second example, in MR the test injection scanning protocol may have much faster time resolution than the anticipated diagnostic imaging protocol so that the patient response function may have better time resolution, whereas the selected diagnostic imaging protocol may have poorer time resolution but better spatial resolution and/or noise properties. The use of a different scan protocol for the test injection as compared to the diagnostic imaging protocol itself may be used as long as the relationship between contrast concentration and imaging system response is sufficiently well known or characterizable for the protocols in use. Phantoms similar to those described in U.S. Pat. No. 10,507,003, assigned to the assignee of the present invention, the contents of which are incorporated herein by reference, may be used to provide additional information on the relationship between contrast concentration and imaging system responses to facilitate this.

The enhancement output can provide timing information that can be useful in determining aspects of the diagnostic injection and/or imaging associated with the diagnostic injection. For example, the patient response can inform the time from the start and/or finish of the injection (or a phase thereof) to peak enhancement in different regions of interest. Assessing patient response can also include contrast scaling and may take into consideration the additional time duration needed to complete the scan itself.

Figure 5B:
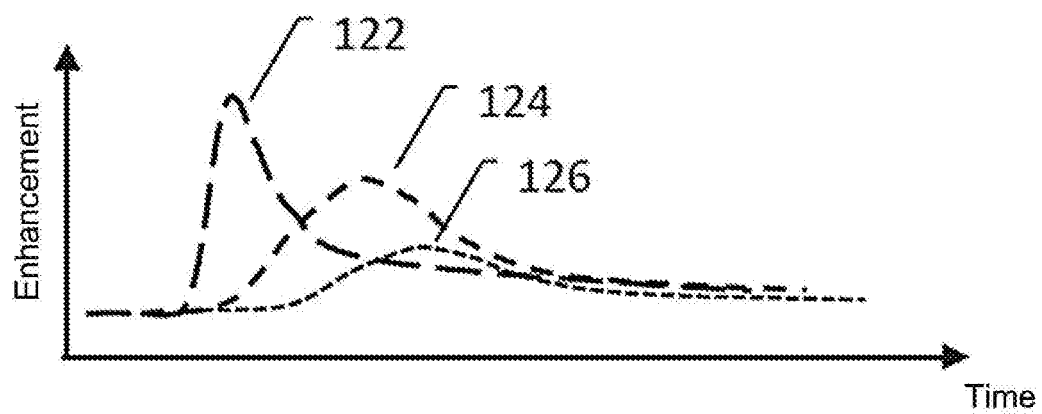
FIG. 5B is a graphical representation of an enhancement output in three regions of interest of a patient upon receiving the test injection of FIG. 5A according to one non-limiting embodiment of the present disclosure.

FIG. 5B illustrates a non-limiting example of a theoretical enhancement output determined from scan data obtained from a test scan of a patient that received the test injection of FIG. 5A. The enhancement output of FIG. 5B shows a patient's response to the test injection in the form of a plot of the increase in HU over time in a first region of interest 122, second region of interest 124, and third region of interest 126. Because the regions of interest 122, 124, 126 are located at different points along the patient's circulatory system, the contrast-containing portion(s) of the test injection reach each region of interest at a different time. Moreover, because the amount of contrast present in the test injection may become diluted, distributed over time, and/or diminished as the test injection passes through the patient, the peak HU value may be the highest in the first region of interest 122 as the amount of contrast may be the greatest at this point, whereas the third region of interest may show the lowest peak HU value. The test injection of FIG. 5A is shown as a rectangular contrast flow profile for example only. Any contrast flow profile, for example triangular or decayed exponential may be used because, mathematically, the patient response to an arbitrary known test injection may be deconvolved or otherwise mathematically manipulated to determine the patient (and system) response function. The enhancement output, such as the enhancement output of FIG. 5B, can be used to derive a patient response function.

Figure 5C:
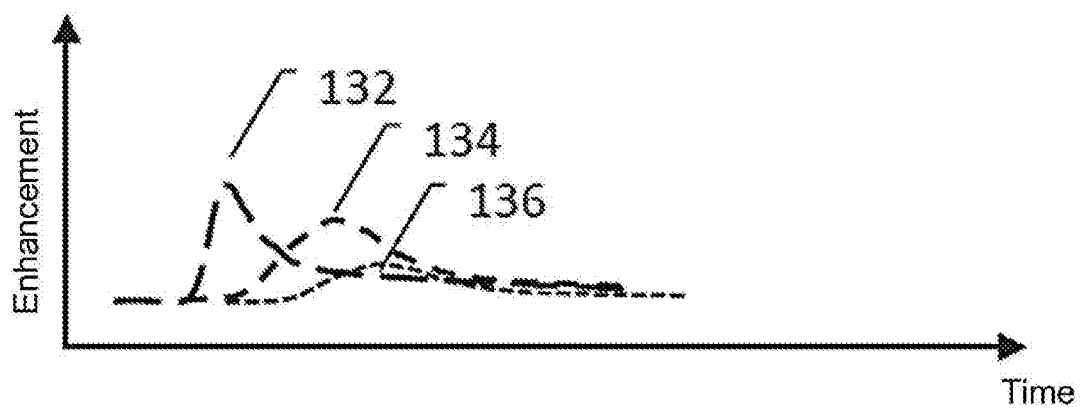
FIG. 5C is a graphical representation of a patient impulse response obtained from the enhancement output of FIG. 5B according to one non-limiting embodiment of the present disclosure.

FIG. 5C illustrates a theoretical patient impulse response for each of the first region of interest 132, second region of interest 134, and third region of interest 136 derived from the enhancement output plot of FIG. 5B. Based at least in part on the patient impulse response, one or more response functions for the patient can be calculated. A patient response function is a transfer function of the system (i.e., the injector and/or patient) and can describe the patient's contribution to the patient's time-attenuation response to intravenously injected contrast. A Fourier transform or convolutional analysis can be used to calculate the patient response function from the enhancement output response to the test injection. If the transfer function of the injection system and its fluid path elements are known, estimated, or insignificant, then their effect can be accounted for and the response function of the patient computed. In some situations, the system response function is not known, is significant, and may only be measured as part of the overall response function. In this case, using the overall response function gives the desired result, that is, the ability to design a diagnostic injection protocol that produces the desired enhancement in the one or more desired regions of interest over the desired one or more imaging times. A proportionality constant for a region of interest, like is the subject of Kawaguchi et al. (discussed above), is not considered a patient function or patient response function for purposes of this disclosure.

Figure 3:
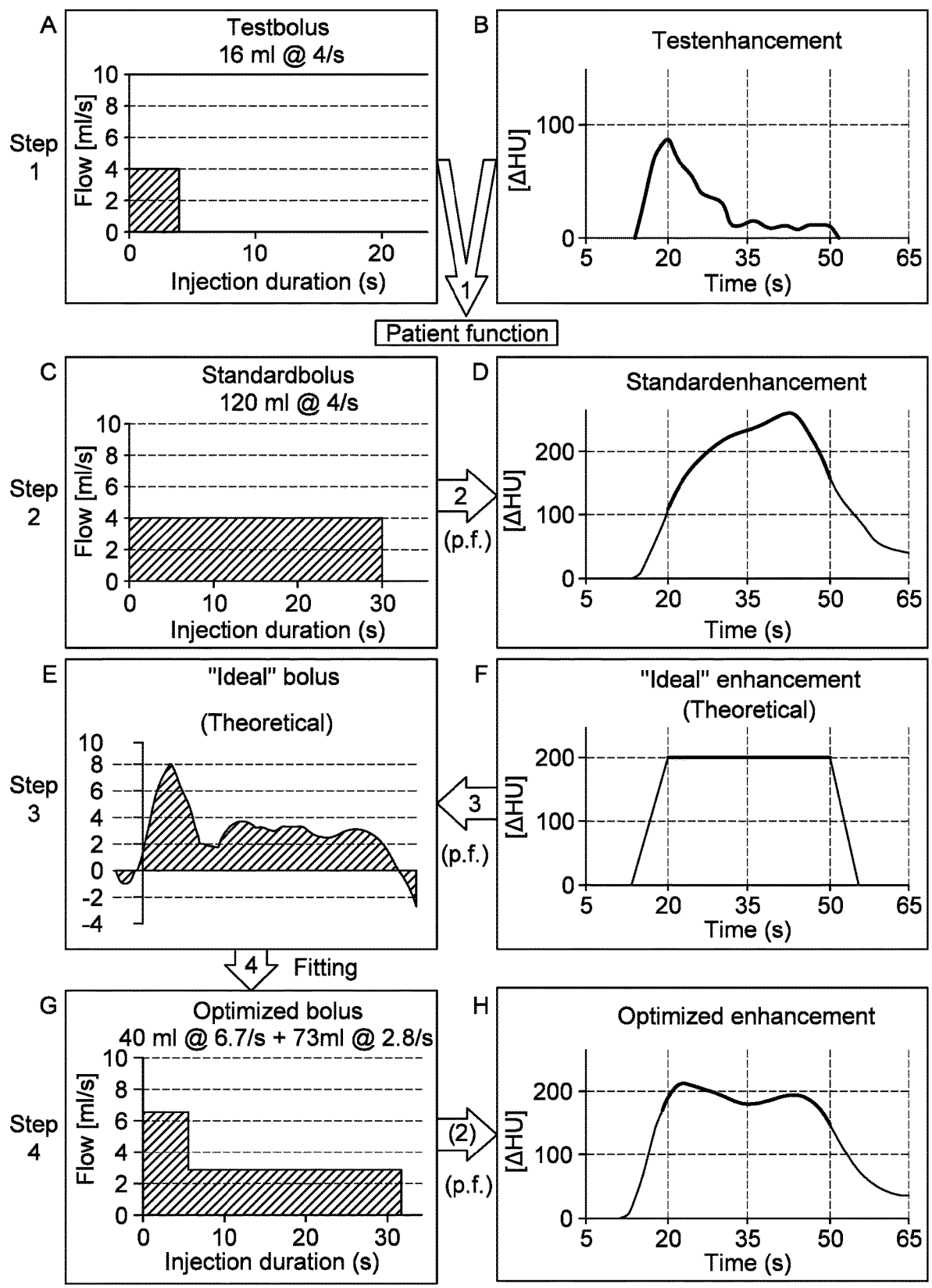
FIG. 3 is an illustration summarizing a methodology described in Fleischmann et al.

Calculation of a patient response function is described in, for example, "Mathematical Analysis of Arterial Enhancement and Optimization of Bolus Geometry for CT Angiography Using the Discrete Fourier Transform," Journal of Computer Assisted Tomography, Volume 23(3), May/June 1999, pp. 474-484, by Fleischmann et al., the entire contents of which are incorporated by reference. There, Fleischmann describes a mathematical technique for the analysis of an individual patient's contribution, referred to therein as the "patient function," to the patient's time-attenuation response to intravenously injected contrast material, which is then used to predict enhancement and to calculate an optimized injection bolus for an individual. Reference is again made to FIG. 3, which describes this process. To determine the patient function from the parameters (volume, flow rate) of a test injection and the corresponding arterial time-attenuation response of the patient to that test injection, Fleishmann describes a program that calculates the patient function in the Fourier space from the relation of a test injection to a patient's corresponding aortic time-attenuation response, the test enhancement.

Once the response functions for the various regions of interest for the patient are determined, a diagnostic injection protocol may be designed, for example, using convolution or Fourier transforms. In determining the appropriate diagnostic injection protocol, a targeted or desired image enhancement in each of the one or more regions of interest for some duration of the scan, and the targeted scan start and stop times (or start time and duration) for the imaging to take place can be fit to the response function(s) in order to determine the parameters of the diagnostic injection that will best allow for the targeted values to be most closely met. In determining the appropriate diagnostic injection protocol, one can also consider the limitations on the imager system's capabilities, such as the scan time and/or bed motion speed, and how those factors may affect the targeted scan start and stop times if more than one region of interest is to be subject to the scan.

The diagnostic injection protocol represents a set of parameters that determine the manner in which a diagnostic injection is administered to the patient. Methods of determining a diagnostic injection protocol from a patient response function are known in the art and are described in, for example, the Fleischmann article mentioned above. Fleischmann describes use of the patient function to determine a theoretically "ideal" bolus, which should achieve a near rectangular enhancement. Since the theoretically "ideal" bolus" contains "unreal" components in the time domain, like oscillations, or negative flow rates, a fitting algorithm is introduced to approximate the ideal flow rates into a practically applicable optimized biphasic bolus (injection). Further examples of determining diagnostic injection protocols from patient functions include those described in U.S. Pat. No. 8,295,914, assigned to the assignee of the present invention, the disclosure of which is incorporated herein by reference, U.S. Pat. No. 9,616,166, assigned to the assignee of the present invention, the disclosure of which is incorporated herein by reference, and U.S. Pat. No. 9,302,044, assigned to the assignee of the present invention, the disclosure of which is incorporated herein by reference.

Figure 5D:
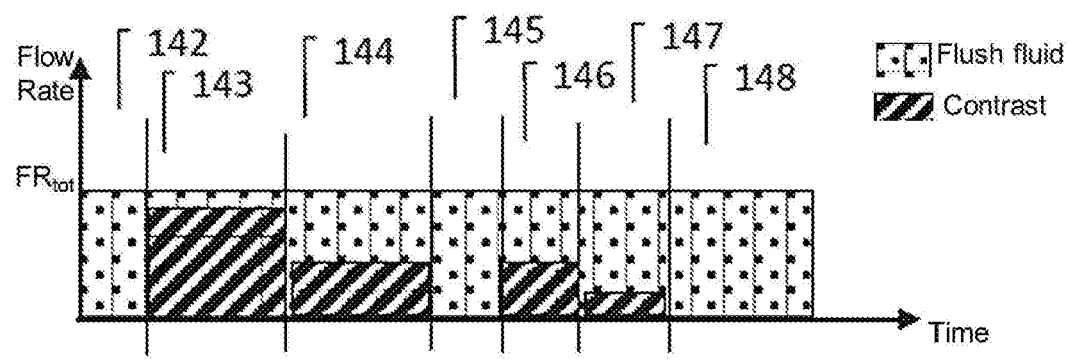
FIG. 5D is a graphical representation of an injection profile of a diagnostic injection according to one non-limiting embodiment of the present disclosure.

FIG. 5D represents the flow profile of a non-limiting example of a diagnostic injection protocol. The diagnostic injection protocol of FIG. 5D could be determined based upon patient response functions calculated from the impulse response of FIG. 5C using a Fourier transform as described in Fleishmann. FIG. 5D illustrates the flow rate and composition of a medical fluid as a function of time. As is the case in FIG. 5D, the diagnostic injection protocol can include more than one phase. For example, with reference to FIG. 5D, the diagnostic injection can include phases 142, 143, 144, 145, 146, 147, and 148. Each phase can include one or both of flush fluid (e.g., saline) and contrast. In FIG. 5D, for example, first phase 142 includes only flush fluid while phases 143, 144, 146, and 147 include a mixture of flush fluid and contrast. The amount of contrast relative to the amount of flush fluid in each phase can vary in order to best approximate the optimized injection as determined from the patient response function. For example, in the diagnostic injection protocol of FIG. 5D, the relative contrast amount is highest in phase 143 and then steadily decreases across the remaining phases that include contrast, 144, 146, and 147. The diagnostic injection protocol can include a pure flush fluid phase as the last phase, an example of which is phase 148, and can also include one or more pure flush fluid phases interspersed between contrast-containing phases. An example of this is phase 145 in FIG. 5D. As mentioned above, the total volumetric flowrate ($FR_{tot}$) in the first phase of the diagnostic injection protocol, phase 142 in FIG. 5D, should be similar to the total volumetric flowrate ($FR_{tot}$) of the test injection.

In some non-limiting embodiments, a substantially consistent total volumetric flowrate can be maintained throughout the duration of the diagnostic injection protocol. An example of this is illustrated in FIG. 5D, where the total volumetric flowrate in each phase (e.g., the amount of contrast plus the amount of flush fluid) is the same or at least similar. This concept is further described in U.S. Patent Application Publication No. 2020/0046895, assigned to the assignee of the present invention, the disclosure of which is incorporated herein by reference. If this concept is applied in conjunction with the concept of maintaining a substantially consistent total volumetric flowrate throughout the test injection discussed above, a substantially consistent total volumetric flowrate can be maintained throughout the duration of the test injection and the diagnostic injection.

The length of each phase of the diagnostic imaging protocol is not limited, and the phase lengths can be the same or similar to the phase lengths for the test injection. In some non-limiting embodiments, the test injection and the diagnostic injection may be of different lengths, that is one (typically the test injection) may be shorter than the other in time duration. The injection phases may be short enough that the contrast concentration may be considered to be continually varying, or in fact the contrast concentration may be continually varying throughout the diagnostic injection.

Computation of the diagnostic injection protocol can be accomplished by a processor executing programming instructions stored in non-volatile, computer readable memory. The physical location of the processor and/or programming instructions is not limited. The processor and/or programming instructions can reside, for example, on an injector, an imager system, or in a cloud-based computing platform or other distributed arrangement whereby multiple clients can access the processor and/or instructions over a data connection and execute the instructions simultaneously. Data from the injector and/or imager, such as scan data, can be communicated to these cloud-based or other distributed systems. In addition, data can be communicated and freely shared between the injector and the imager, such as through the direct and indirect data communication techniques, and/or the other data capture and transfer techniques, described elsewhere in this disclosure.

Once the diagnostic injection protocol is designed, the patient may be administered a diagnostic injection according to the parameters that form the diagnostic injection protocol. The patient may also be subject to a diagnostic imaging scan. Diagnostic imaging is a well-known technique used to capture images (such as contrast-aided images) of certain regions of interest that can be reviewed for purposes of providing medical diagnoses of the patient.

Figure 5E:
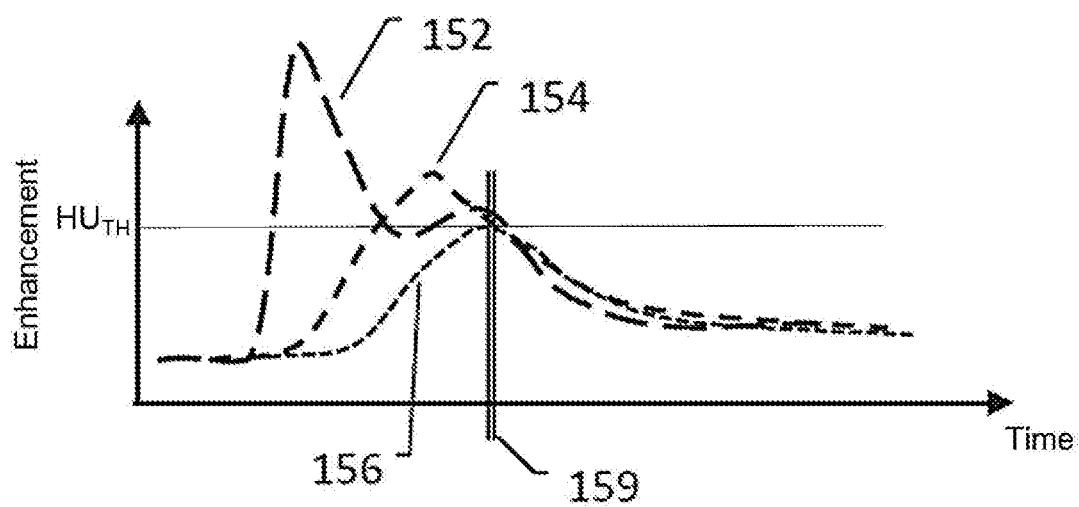
FIG. 5E is a graphical representation of the enhancement output in three regions of interest of a patient upon receiving the diagnostic injection of FIG. 5D according to one non-limiting embodiment of the present disclosure.

In certain non-limiting embodiments, the timing of the diagnostic imaging scan (e.g., the scan start and stop time) can be informed by timing information learned from the test injection. For example, with reference to FIG. 5E, shown is a theoretical plot of enhancement over time for a patient that received the diagnostic injection of FIG. 5D. As can be seen by comparing FIG. 5B and FIG. 5D, the enhancement output of the patient upon receiving the diagnostic injection is similar in shape to the enhancement output of the test injection of FIG. 5B, owing at least in part to the use of the enhancement output of FIG. 5B in determining the diagnostic injection protocol of FIG. 5E. With reference to FIG. 5E, the enhancement achieved in a first, second, and third region of interest, 152, 154, and 156, respectively, is plotted over time. First 152, second 154, and third 156, regions of interest in FIG. 5E can be the same as first 122, second 124, and 126 regions of interest in FIG. 5B. The scan time is illustrated as 159 in FIG. 5E. In this instance, scan time 159 is selected at the point of maximum enhancement of third region of interest 156. At this point in time, the enhancement of first 152, second 154, and third 156, regions of interest are all above a threshold value ($HU_{TH}$), which may be a value determined to be the minimum required to allow for acceptable image quality. In addition, the enhancement may preferably be below an upper bound at which point distortion, non-linearity may occur, or the enhancement may be confused with another phenomena, for example calcification in coronary artery plaques. By using an diagnostic injection designed with the test injection of this disclosure, the enhancement of all the desired ROIs may be approaching the optimum contrast concentration which produces the optimum image enhancement. By performing the scan at this time, a scan of limited duration can be performed to capture all three regions of interest as part of the same scan, thereby avoiding multiple scans and increased radiation exposure to the patient. In addition or alternatively, scan time 159 may be selected and/or the diagnostic injection profile or phases may be designed to better differentiate between two or more tissues or between two or more of healthy tissues and diseased tissues in an imaging slice or section. For example, the scan time and injection bolus may be selected to show the arterial phase but not the venous phase in a liver or brain study. To help accomplish this, the patient response function for a ROI may be segmented into more than one type of tissue in the model used to create the patient functions, for example to separate the two humps in the measurement of a ROI that has both arterial and venous phases into one hump or curve representing the arterial phase and a second curve representing a venous phase. Alternative two or more ROIs may be selected to assess and/or represent only one type of tissue.

An example procedure where this method may be useful is a triple rule-out where the regions of interest are the aorta, the coronary arteries, and the pulmonary artery. Performing a test injection according to the process described in this disclosure can assist in designing a diagnostic injection and accompanying imaging scan whereby a single imaging scan of limited duration can provide sufficient information for a diagnosis, thereby reducing radiation dose if CT is being used.

Figure 5F:
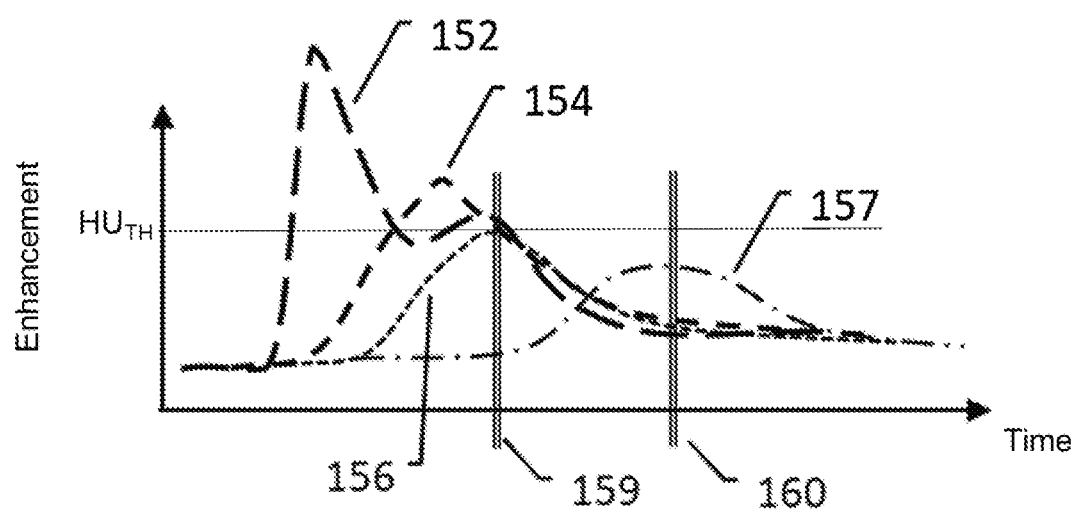
FIG. 5F is a graphical representation of the enhancement output in four regions of interest of a patient upon receiving the diagnostic injection of FIG. 5D according to one non-limiting embodiment of the present disclosure.

For further example, with reference to FIG. 5F, shown is a theoretical plot of enhancement over time for a patient that received the diagnostic injection of FIG. 5D who has a further region of interest 157 that is to be imaged during this study. The additional region of interest has an enhancement curve indicated 157 in FIG. 5F. The additional region of interest 157 may, for example, be geometrically separated from the other regions of interest such that it cannot be imaged at the same time and/or the additional region of interest 157 may have an enhancement curve with a significantly different time response. In this situation, the test injection allows the prediction of the estimated enhancement in region of interest 157 over time and a recommendation that the scan of region of interest 157 be conducted at scan time 160 can be made from the results of the test scan. Scan time 160 can be sufficiently after scan time 159 so as to allow the patient to be repositioned if needed. The estimated enhancement curve in this example also predicts that the enhancement will be slightly lower than optimum but will be sufficient for the diagnostic question at hand.

Figure 6:
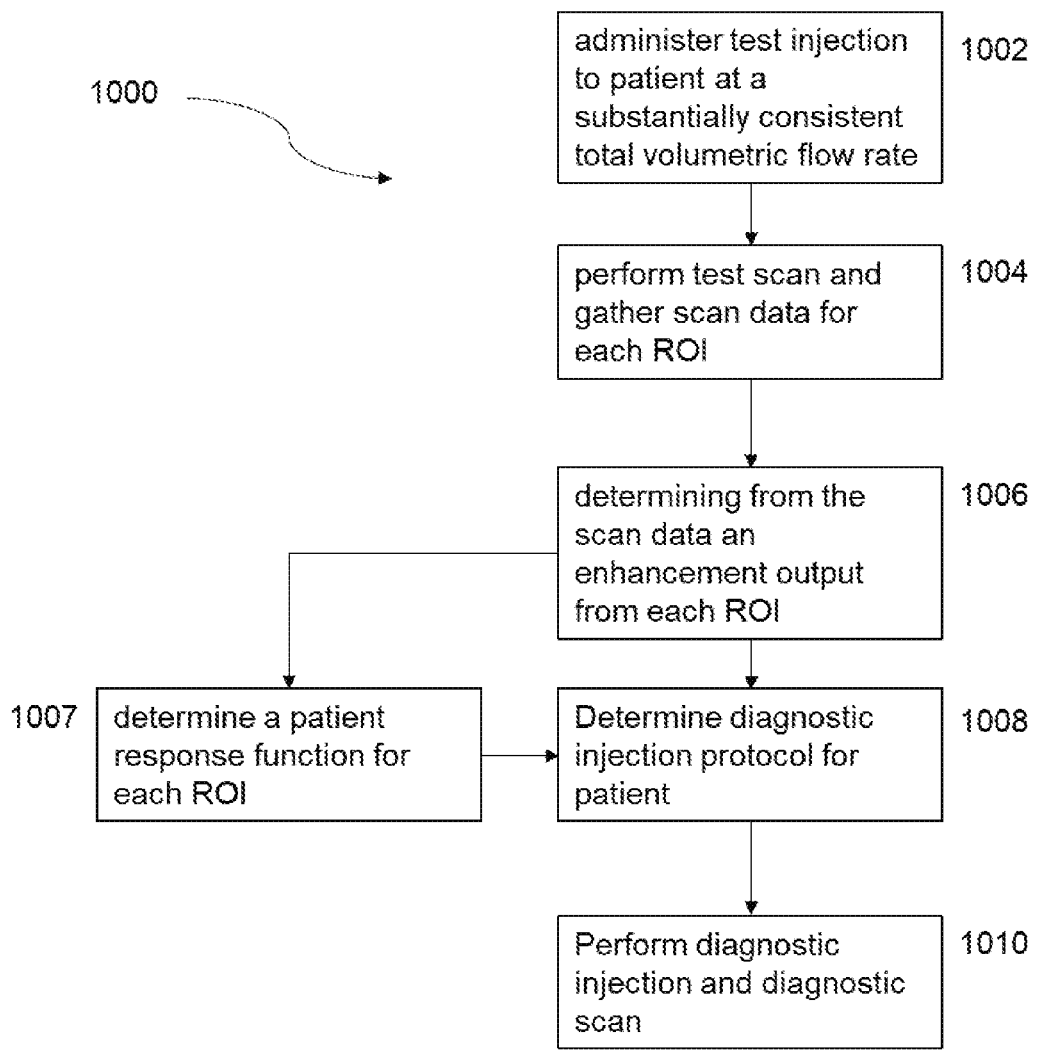
FIG. 6 is a flowchart showing the steps of determining a diagnostic injection protocol according to one non-limiting embodiment of the present disclosure.

Referring to FIG. 6, a method 1000 is shown for determining, and optionally administering, a diagnostic injection protocol according to certain non-limiting embodiments. The method generally follows the work flow described above.

With continued reference to FIG. 6, step 1002 may include administering a test injection into the patient at a preselected total volumetric flowrate for a preselected duration. As described above, the test injection can include a contrast agent and flush fluid. The preselected total volumetric flowrate of the test injection can be substantially maintained throughout the duration of the test injection and can be substantially similar to the anticipated total volumetric flowrate of the fluid to be administered during at least a first phase of the diagnostic injection protocol.

With continued reference to FIG. 6 step 1004 may include performing a test scan of one or more regions of interest of the patient as the test injection propagates therethrough to obtain scan data resulting therefrom. This scan can be performed by, for example, a CT imager system.

With continued reference to FIG. 6 step 1006 may include determining from the scan data an enhancement output from each of the one or more regions of interest at one or more points in time as a result of the propagation of the test injection therethrough. As described above, the enhancement output can be a measure of the contrast enhancement increase in the one or more regions of interest over time.

With continued reference to FIG. 6, step 1008 may include determining the diagnostic injection protocol. As described, the diagnostic injection protocol can be determined based at least in part upon the enhancement output from each of the one or more regions of interest at each of the one or more points in time. As also described above, and depicted as step 1007 in FIG. 6, determining the diagnostic injection protocol can involve first determining a patient impulse response and, from the impulse response, defining one or more patient response functions for the regions of interest. The response functions can then be used to determine the diagnostic injection protocol. The first phase of the diagnostic injection protocol may involve administering the fluid at a total volumetric flowrate that is substantially similar to the preselected total volumetric flowrate of the test injection.

With continued reference to FIG. 6, step 1010 may include administering a diagnostic injection to the patient according to the diagnostic injection protocol. This step may additionally include performing a diagnostic scan of the patient to measure the patient's response to the diagnostic injection and/or capture patient images that can be used for diagnosis.

Figure 7:
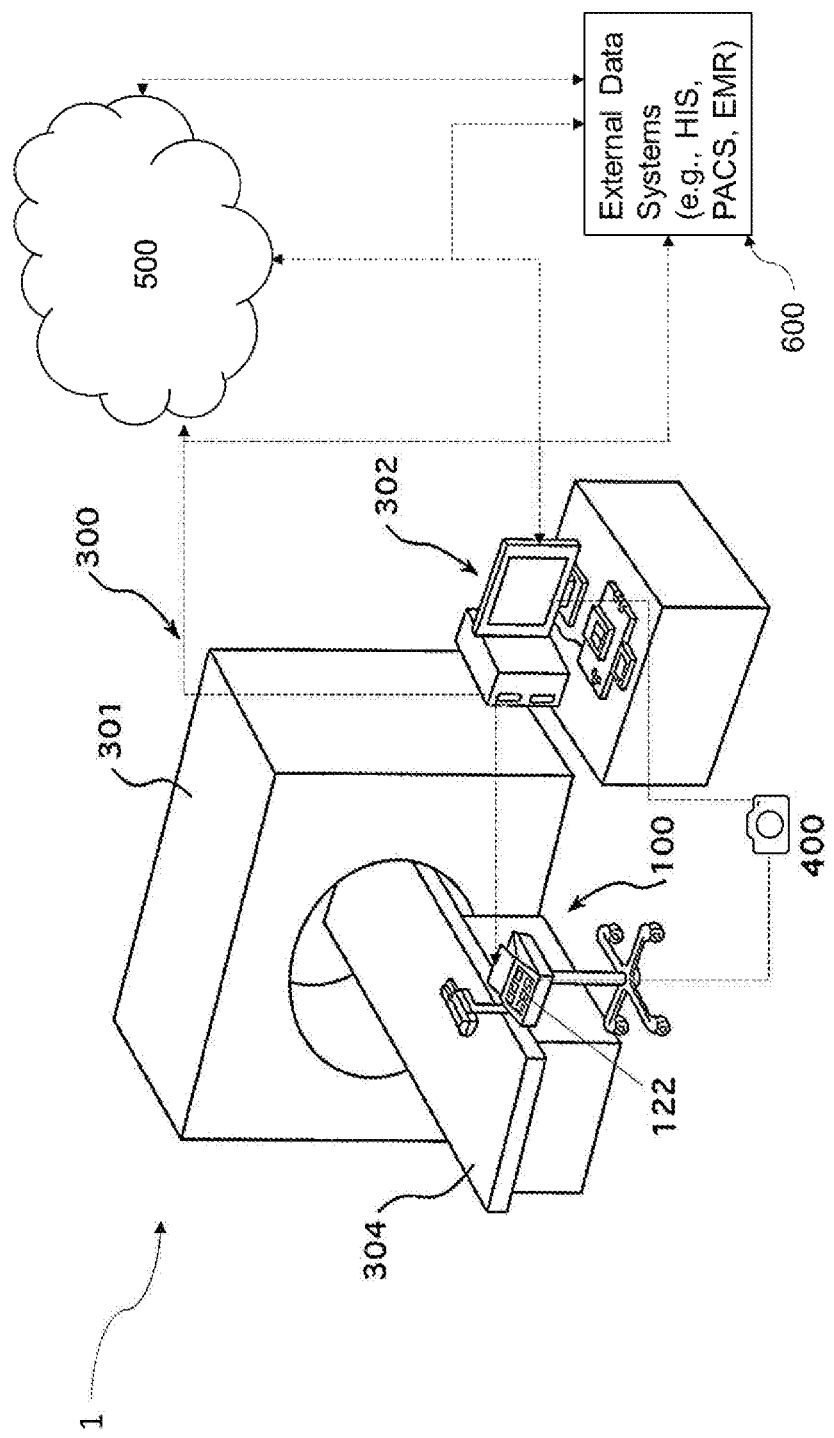
FIG. 7 is a schematic of a system for performing injection and medical imaging procedures according to one non-limiting embodiment of the present disclosure.

With reference to FIG. 7 also provided is a system 1 for determining an injection protocol for administering a fluid including contrast to a patient in connection with a diagnostic imaging procedure. FIG. 7 illustrates an example of the physical and functional relationship of an injector 100 and an imager system 300. The imager 300 depicted is a CT scanner, but other imagers, such as an MRI system, an ultrasound imaging system, a positron emission tomography (PET) system, and optical imaging system, and systems which are combinations thereof may also be applicable to certain aspects of this disclosure. The image acquisition apparatus 301, commonly called a gantry in CT parlance, contains an X-ray tube that emits X-ray energy as its imaging energy and sensors that measure the X-rays after they have passed through the patient. This information, which represents one example of scan data as that term is used above, can include a measure of the contrast enhancement (HU) observed at one or more regions of interest. This information can also be used by an algorithm, implemented in a computer program in the imager, to create one or more images of the region(s) of interest which can be displayed on the imager user interface 302, commonly called a user console. The image(s) can also be sent through the hospital information system (HIS), the radiology information system (RIS) or a network to other devices, commonly referred to as remote viewing or work stations where the image(s) can be reviewed for diagnostic purposes.

Before the imaging procedure begins, the patient is placed on the patient couch, also called a support, positioner, table, or bed 304 and positioned so that the correct region or portion of the body is imaged. The CT scanner is programmed and set up with the imager user interface 302 as well. During the scan, progress can usually be monitored on the imager user interface 302.

Injector 100 can be moved around with respect to imager system 300 to facilitate injection of the patient and can be used for both the test injection and a diagnostic injection. Injector 100 can include an injector user interface 122 that can be used to program injector 100 and to monitor injection status during an injection. Alternatively, injector 100 and imager system 300 can use a common user interface, such as user interface 302. Injector 100 can also include a control room unit (CRU) and a scan room unit (SRU), with the latter, often referred to as an injector head unit, capable of holding two syringes, one for contrast medium and one for saline. Such injectors, control systems therefore and injector protocols used therewith are described, for example, in U.S. Pat. Nos. 10,166,326, 6,643,537, 6,339,718, 6,673,033, 6,767,319, 6,958,053 and 5,494,036, the disclosures of which are incorporated herein by reference.

Injector 100 (or a component thereof) can be in communicative connection with imager system 300 (or a component thereof) and one, a plurality, or all the components of injector 100 and imager system 300 can be integrated. In some non-limiting embodiments, there can be direct or indirect system-to-system data communication between imager system 300 (or components thereof) and injector 100 (or components thereof). Such data communication can facilitate the transfer of data gathered by imager system 300 during an imaging scan of the patient, such as during the test scan, to the injector 100 so that such data (e.g., scan data and/or an enhancement output) can be utilized by the injector 100 for determining, for example, details of the diagnostic injection protocol. For example, imager system 300 can communicate data representing the response of one or more regions of interest in the patient to a test injection to injector 100.

This communication between imager system 300 and injector 100 can be a direct connection. This could include a direct wired communication link or a direct wireless communication link such as Bluetooth or a communication link that uses a passive routing mechanism such as a WiFi router. Communication between imager system 300 and injector 100 can also be an indirect connection, such as one that passes the communication through another system (e.g., a cloud-based server) which may also allow for optional processing of the communicated data. For example, an indirect communication between injector 100 and imager system 300 may utilize a cloud computing platform 500 which receives information sent from one system (e.g., the imager system 300), recognizes key features of the information (e.g., that the information includes scan data from a test scan, such as data related to a patient response to a test injection), and sends the relevant portions of that information to the injector 100. The dashed lines in FIG. 7 depict non-limiting examples of data communication links.

Another method of transferring data between injector 100 and imager system 300 is through a data capture process whereby one system (e.g., injector 100) receives information from another system (e.g., imager system 300) using a data capture device 400 such as a digital camera or tablet computer. Data capture device 400 is illustrated in FIG. 7 as a digital camera, and the dashed lines indicate the data exchange between the display associated with the imager user interface 302, where data can be captured, and the injector 100, where the data can be transferred. Integration and data exchange between an imager and injector often depends upon the cooperation of the original equipment manufacturers (OEMs). This is often a low priority for the OEMs. A data capture process in which a digital image (e.g., photograph) of a display screen on the imager and/or injector can be used as an alternative to integration and data exchange. For example, a digital camera (e.g., a smartphone camera) can be used to take a photograph of a plot of the test scan, such as an enhancement output similar to FIG. 5B that is presented on a display associated with the imager system 300, such as on imager user interface 302. By way of further example, a digital camera can be used to take a photograph of the injection parameters (e.g., the test injection parameters) that are presented on a display associated with the injector 100, such as injector user interface 122. The photograph could then be processed using data recognition and extraction techniques, such as optical character recognition (OCR) or other known techniques, to gather key information that can be used by another system (e.g., injector 100) for purposes described herein. The data recognition and extraction processing could be performed locally on the digital camera prior to transferring the extracted data to the system, or the photograph can be transferred from the digital camera to the system and the data recognition and extraction processing can then be performed by the system. Non-limiting examples of the type of data that could be transmitted through this technique include patient information, such as patient identification (ID), age, height, body mass index (BMI) or weight, as well as scan data such as, for example, scan duration, tube voltage (kVp), image enhancement over time, time to peak enhancement, and peak enhancement. This technique has the benefit that it can be implemented without the cooperation of the injector and imager OEMs. This technique also permits information from imager system 300 (e.g., test scan information) to be transmitted or otherwise provided to the injector 100 without the chance of human error which could occur if manual entry of such data is required. Thus, this technique can both reduce the time the radiologist, technologist or other medical personnel takes to transmit the imager system information to the injector system (reduced workflow time) and, second, it can limit the possibility of any human error that would otherwise be made in measuring and transferring the imager system information manually.

As yet another alternative, an operator may transfer some or all of the required data manually. This can be accomplished by entering the required data directly into the injector user interface 122 and/or the imager user interface 302.

Injector 100 and imager system 300 may be connected to one or more external data systems 600 for storage and/or retrieval of information or process of data, including for example hospital information systems (HIS), Radiology information systems (RIS), picture archive systems (PACS), algorithm or AI services, and cloud computing systems or services, as depicted in FIG. 7.

As mentioned above, the processor and programming instructions for computation of the diagnostic injection protocol according to the methods described above can be stored in non-volatile, computer readable memory, and the processor and/or programming instructions can reside, for example, within injector 100 (or a component thereof) and/or imager system 300 (or a component thereof), or in a cloud-based 500 or other distributed arrangement whereby multiple clients can access the processor and/or instructions over a data connection and execute the instructions simultaneously. In one non-limiting example, the processor and programming instructions may be incorporated into the software and hardware associated with medical imaging equipment (e.g., scanner and injector), such as the Certegra® Workstation product offered by Bayer HealthCare LLC.

Although the present invention has been described in detail in connection with the above embodiments and/or examples, it should be understood that such detail is illustrative and not restrictive, and that those skilled in the art can make variations without departing from the invention. The scope of the invention is indicated by the following claims rather than by the foregoing description. All changes and variations that come within the meaning and range of equivalency of the claims are to be embraced within their scope.

The invention claimed is:

1. A method of administering a medical fluid comprising a contrast agent to a patient in connection with a diagnostic imaging procedure, the method comprising:
   (a) administering a test injection into the patient at a preselected total volumetric flowrate for a preselected duration, wherein the test injection is comprised of a volumetric amount of a contrast agent and, optionally, a volumetric amount of a flush fluid, wherein the preselected total volumetric flowrate of the test injection is substantially maintained throughout the preselected duration of the test injection, wherein the test injection is comprised of a plurality of phases including at least a first phase in which the fluid administered consists entirely of the flush fluid and a second phase following the first phase in which the fluid administered comprises both the contrast agent and the flush fluid, and wherein the preselected total volumetric flowrate is substantially similar to an anticipated total volumetric flowrate of the fluid to be administered during at least a first phase of a diagnostic injection protocol;
   (b) performing a test scan of one or more regions of interest of the patient as the test injection propagates therethrough to obtain scan data resulting therefrom;
   (c) determining from the scan data an enhancement output from each of the one or more regions of interest at one or more points in time as a result of the propagation of the test injection therethrough;
   (d) determining a patient response function for the patient for each of the one or more regions of interest based, at least in part, on the enhancement output;
   (e) determining the diagnostic injection protocol based at least in part upon the patient response function from at least one of the one or more regions of interest, wherein a first phase of the diagnostic injection protocol comprises administering the fluid at a total volumetric flowrate that is substantially similar to the preselected total volumetric flowrate of the test injection; and administering a diagnostic injection into the patient according to the diagnostic injection protocol.

2. The method of claim 1, wherein a total duration of any contrast-containing phases of the test injection is no more than 80% of a total duration of any contrast-containing phases of the diagnostic injection.

3. The method of claim 1, wherein administering the diagnostic injection into the patient comprises:
delivering, during a first duration of the diagnostic injection protocol, a volume of the medical fluid at a total volumetric flowrate, wherein the total volumetric flowrate is substantially similar to the preselected total volumetric flowrate of the test injection.

4. The method of claim 1, wherein the one or more regions of interest include at least two regions of interest.

5. The method of claim 1, wherein the fluid administered during the second phase of the test injection further comprises the flush fluid.

6. The method of claim 1, wherein the fluid administered during the second phase of the test injection comprises at least 50% by volume of the contrast agent.

7. The method of claim 1, wherein the test injection comprises, among the plurality of phases, a third phase that follows the second phase, wherein a fluid administered during the third phase of the test injection consists entirely of the flush fluid.

8. The method of claim 1, wherein a final phase of the plurality of phases of the test injection comprises administering a fluid that consists entirely of the flush fluid.

9. The method of claim 1, wherein the preselected total volumetric flowrate of the test injection is between about 0.5 mL/s and about 10 mL/s.

10. The method of claim 1, wherein the preselected total volumetric flowrate of the test injection is between about 1 mL/s and about 7 mL/s.

11. The method of claim 1, wherein the preselected duration of the test injection is between about 5 and about 50 seconds.

12. The method of claim 1, wherein the preselected duration of the test injection is between about 5 and about 20 seconds.

13. The method of claim 1, wherein a timing to perform the test scan is determined based upon at least one of the following: information about a medical imager system to be used to perform the test scan, the one or more regions of interest, and movement capability of the medical imager system.

14. The method of claim 13, wherein the test injection is administered by an injector and the test scan is performed by the medical imager system.

15. The method of claim 14, further comprising transferring at least one of the scan data and the enhancement output from the medical imager system to the injector through a data capture method comprising taking, using a digital camera, a photograph of a user interface of the medical imager system, wherein the user interface displays at least one of the scan data and the enhancement output, processing the photograph to extract portions of the at least one of the scan data and the enhancement output, and transferring the extracted portions of the at least one of the scan data and the enhancement output to the injector.

16. A fluid delivery system, comprising:
a fluid administration device adapted to deliver to a patient a test injection and a diagnostic injection, wherein each injection comprises a volumetric amount of a contrast agent and, optionally, a volumetric amount of a flush fluid; and a processor and non-transitory machine-readable storage medium, wherein the non-transitory machine-readable storage medium comprises programming instructions that, when executed by the processor, enable the fluid administration device to:
administer the test injection at a preselected total volumetric flowrate for a preselected duration, wherein the preselected total volumetric flowrate is substantially maintained throughout the preselected duration of the test injection, wherein the test injection is comprised of a plurality of phases including at least a first phase in which the fluid administered consists entirely of the flush fluid and a second phase following the first phase in which the fluid administered comprises both the contrast agent and the flush fluid, and wherein the preselected total volumetric flowrate is substantially similar to an anticipated total volumetric flowrate of at least a first phase of the diagnostic injection;
receive scan data from a test scan of one or more regions of interest of the patient, wherein the test scan is performed as the test injection propagates through the patient;
determine from the scan data an enhancement output from each of the one or more regions of interest at one or more points in time as a result of the propagation of the test injection through the patient;
determine a patient response function for the patient for each of the one or more regions of interest based, at least in part, on the enhancement output;
determine a diagnostic injection protocol, based at least in part, upon the patient response function from at least one of the one or more regions of interest; and
administer a diagnostic injection into the patient according to the diagnostic injection protocol.

17. A system for patient imaging, comprising:
a fluid administration device adapted to deliver to a patient a test injection and a diagnostic injection, wherein each injection comprises a volumetric amount of a contrast agent and, optionally, a volumetric amount of a flush fluid;
a medical imager system adapted to perform an imaging scan of the patient; and
a processor and non-transitory machine-readable storage medium, wherein the non-transitory machine-readable storage medium comprises programming instructions that, when executed by the processor, enable the system to:
administer, by the fluid administration device, the test injection at a preselected total volumetric flowrate for a preselected duration, wherein the preselected total volumetric flowrate is substantially maintained throughout the preselected duration of the test injection, wherein the test injection is comprised of a plurality of phases including at least a first phase in which the fluid administered consists entirely of the flush fluid and a second phase following the first phase in which the fluid administered comprises both the contrast agent and the flush fluid, and wherein the preselected total volumetric flowrate is substantially similar to an anticipated total volumetric flowrate of at least a first phase of the diagnostic injection;
generate scan data from a test scan performed by the medical imager system of one or more regions of interest of the patient as the test injection propagates through the patient;

determine from the scan data an enhancement output from each of the one or more regions of interest at one or more points in time as a result of the propagation of the test injection through the patient;

determine a patient response function for the patient for each of the one or more regions of interest based, at least in part, on the enhancement output;

determine a diagnostic injection protocol based, at least in part, upon the patient response function from at least one of the one or more regions of interest; and administer, by the fluid administration device, a diagnostic injection into the patient according to the diagnostic injection protocol.

18. The system of claim 17 further comprising one of:

the fluid administration device being configured to determine the diagnostic injection protocol for the diagnostic injection; and the medical imager system being configured to determine the diagnostic injection protocol for the diagnostic injection.

19. The system of claim 17, further comprising at least one of:

a cloud-based computing platform that is accessible by the fluid administration device and/or the medical imager system, wherein at least a portion of the programming instructions reside on the cloud-based computing platform; and a data capture device configured to take a photograph of a user interface of the medical imager system and transfer the photograph or extracted portions thereof to the fluid administration device.

* * * * *